(12) United States Patent
Hylkema

(10) Patent No.: US 11,629,488 B2
(45) Date of Patent: *Apr. 18, 2023

(54) PARTICLE SEPARATOR

(71) Applicant: George Hylkema, Newport Beach, CA (US)

(72) Inventor: George Hylkema, Newport Beach, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/385,514

(22) Filed: Jul. 26, 2021

(65) Prior Publication Data

US 2022/0018111 A1 Jan. 20, 2022

Related U.S. Application Data

(63) Continuation of application No. 17/174,999, filed on Feb. 12, 2021, now Pat. No. 11,098,473, which is a continuation-in-part of application No. 16/893,759, filed on Jun. 5, 2020, now Pat. No. 10,918,974.

(60) Provisional application No. 62/859,863, filed on Jun. 11, 2019.

(51) Int. Cl.

| | |
|---|---|
| *B01D 21/02* | (2006.01) |
| *E03F 5/14* | (2006.01) |
| *E03F 5/22* | (2006.01) |
| *B01D 21/00* | (2006.01) |
| *E03C 1/26* | (2006.01) |
| *B01D 21/24* | (2006.01) |

(52) U.S. Cl.
CPC ............ *E03F 5/14* (2013.01); *B01D 21/0018* (2013.01); *B01D 21/0042* (2013.01); *B01D 21/2483* (2013.01); *E03C 1/26* (2013.01); *E03F 5/22* (2013.01)

(58) Field of Classification Search
CPC ............ B01D 21/0018; B01D 21/0039; B01D 21/0042; B01D 21/02; B01D 21/2483; E03C 1/26
USPC ......... 210/801, 521, 532.1, 533; 4/629, 679, 4/681

See application file for complete search history.

(56) References Cited

U.S. PATENT DOCUMENTS

| | | |
|---|---|---|
| 246,453 A | 8/1881 | Brandeis |
| 826,580 A | 7/1906 | Keyes |
| 2,467,547 A | 4/1949 | Birnbaum |
| 2,656,926 A | 10/1953 | Garaycochea |
| 3,837,494 A | 10/1974 | Stevenson |
| 4,761,235 A | 8/1988 | Haentjens |
| 4,957,621 A | 9/1990 | Rohloff |
| 6,149,812 A | 11/2000 | Erickson |

(Continued)

*Primary Examiner* — Christopher Upton
(74) *Attorney, Agent, or Firm* — Carlos A. Fisher; Stout, Uxa & Buyan, LLP

(57) ABSTRACT

An apparatus and methods for the separation of macroscopic solid body particles (SBPs) from a fluid stream contained in a conduit, such as a hose or pipe. The method involves utilizing a particle separator having a fluid inlet port connected to a fluid inlet conduit and a fluid outlet port connected to a fluid outlet conduit to change the direction (and optionally the velocity) of the fluid stream within a lumen of an enclosed vessel component of the particle separator sufficiently to permit SBPs to fall by gravity (and/or to descend due to inertia) into a removable receptacle within a bottom portion of the vessel component while directing the flow of cleansed fluid to the fluid outlet port of the particle separator.

19 Claims, 18 Drawing Sheets

(56) References Cited

U.S. PATENT DOCUMENTS

| | | | |
|---|---|---|---|
| 6,797,178 B2 * | 9/2004 | Albiston | B01D 21/0012 |
| | | | 210/801 |
| 6,860,991 B1 | 4/2005 | Hagon | |
| 7,544,303 B2 | 6/2009 | Frink | |
| 10,918,974 B1 * | 2/2021 | Hylkema | B01D 21/0042 |
| 11,098,473 B1 * | 8/2021 | Hylkema | B01D 21/0042 |

* cited by examiner

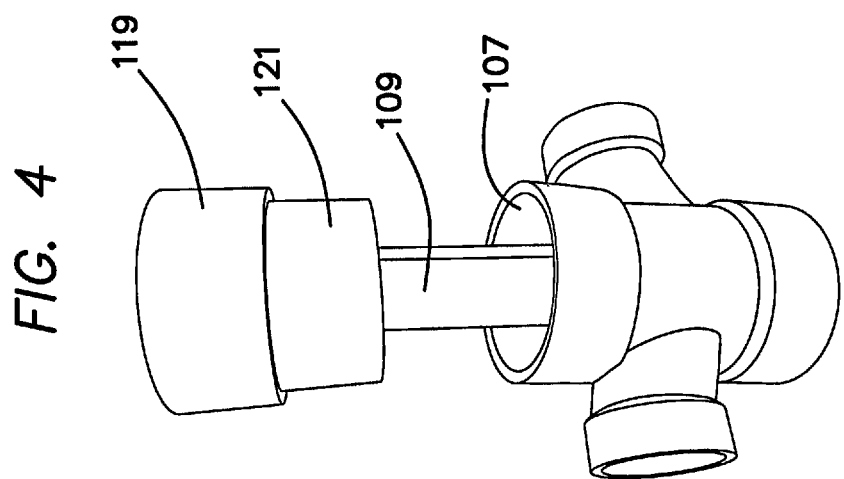
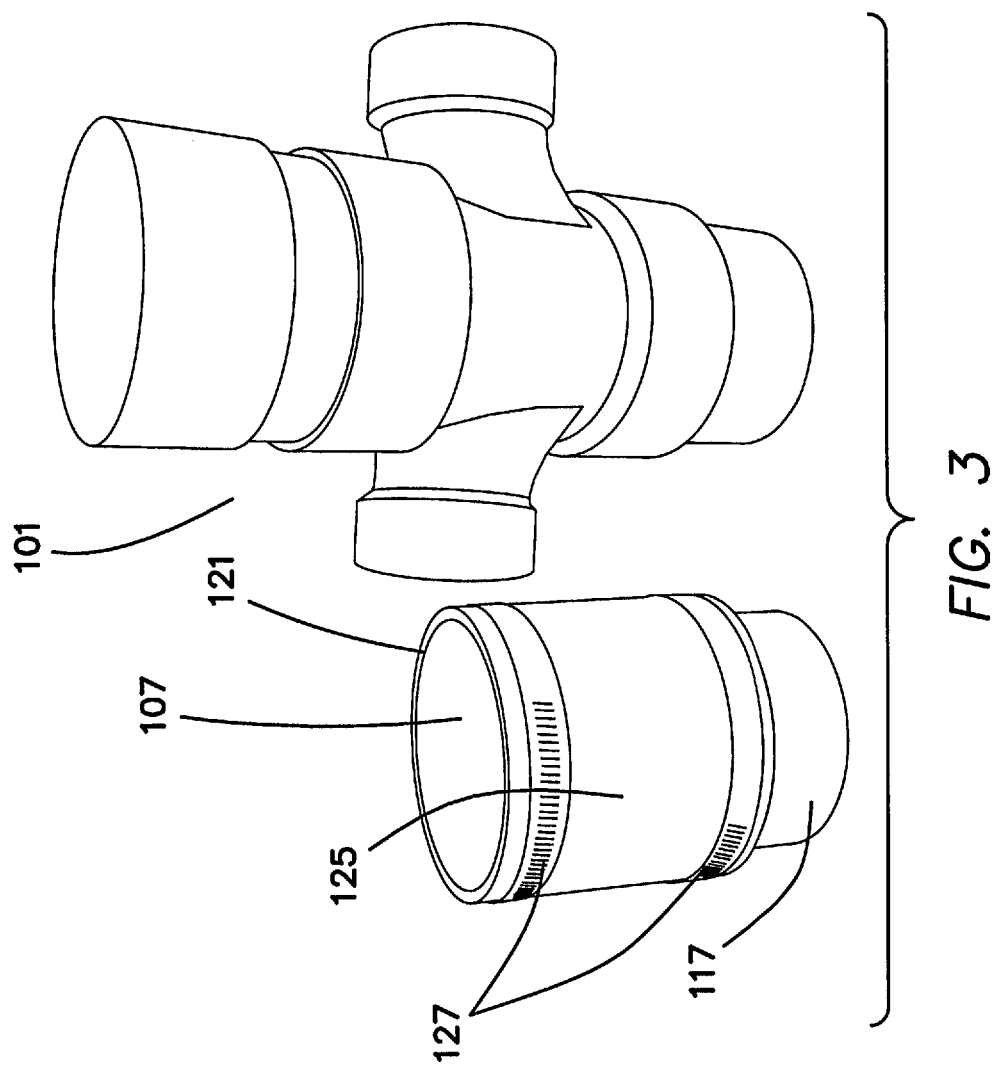

PARTICLE SEPARATOR

CROSS-REFERENCE TO RELATED APPLICATIONS

This application is a continuation of U.S. patent application Ser. No. 17/174,999, filed Feb. 12, 2021 (now U.S. Pat. No. 11,098,473), which was a continuation-in-part of U.S. patent application Ser. No. 16/893,759, filed Jun. 5, 2020 (now U.S. Pat. No. 10,918,974), which claimed the benefit pursuant to 35 U.S.C. § 111(e) of provisional patent application 62/859,863, filed Jun. 11, 2019, each of which is hereby incorporated by reference herein in its entirety.

FIELD OF THE INVENTION

The present invention relates to the separation of macroscopic solid body particles from a flowing fluid stream in which they are contained. Such particle-containing fluid may comprise an aqueous or non-aqueous solution, emulsion, dispersion or suspension, or a gas flowing in combination with denser, solid particulate contaminants within a contained conduit such as, without limitation, a pipe hose, tube, or other. Thus, embodiments of the invention may, without limitation, pertain to fields of endeavor including industrial processes in the oil, gas, or mining industries, the automotive or aerospace fields, the sewage treatment industry, the plumbing field, the shipping and military fields, the construction industry and the boating field.

BACKGROUND AND SUMMARY OF THE INVENTION

Unless otherwise indicated in the present application, each and every range of values (lengths, depths, volumes, and the like) stated in this specification, including the claims, are intended to specifically include all subranges, and not just the endpoint(s), within the range to three significant figures. For example, a range stated to be 0 to 10 is intended to disclose all whole numbers between "0 and 10" such as, for example 1, 2, 3, 4, etc., all fractional numbers between 0 and 10 to three significant figures, for example 1.500, 2.300, 4.570, etc., the endpoints 0 and 10, and all subranges included therein, such as the subrange "4.570 to 9".

The desire to separate a fluid from solid particles is ubiquitous in many fields, such as the construction industry, the mining industry, the oil industry, in recreational activities such as boating and the like. Perhaps less commonly, it may be desirable to separate particles from a flowing fluid. Often, but not invariably, pumps, gravity or inertial forces, such as a centrifugal force, are used to mobilize the fluid into a flow, which may contain such contaminants.

By "conduit" is meant a channel, pipe, tunnel, tube or other structure that acts to convey a fluid from one location to another.

In many cases a pump may be employed in conjunction with tubing, piping or another conduit to draw a fluid from one location and place it in another location. For example, a gasoline pump draws a fluid (gasoline) from a filling station's tanks and deposits the liquid gasoline into the tank of a motor vehicle. Similarly, the fuel pump of a car draws the fuel from the car's fuel tank and delivers the fuel to the engine.

In such uses contaminants in the fuel (including such microparticulates and/or small macroparticulates as dirt, rust, metal shavings and microbial growth) are typically removed from the fuel during operation of the pump using a replaceable fuel filter. Materials used for such filtration may include porous filter paper, plastics, quartz fiber, glass fiber, and the like. Such fuel filters typically have porosities of about 0.5 µm to about 25-25 µm, depending on the engine and fuel type.

However, when the fluid is heavily contaminated with contaminants such filters can become blocked quite quickly, leading to high back pressures and loss in the fluid flow rate and volume. This can also be the case the fluid is or becomes significantly more viscous than water (such as motor oil at room temperature); the addition of a filter having a porosity on the micrometer or even the millimeter scale can adversely affect the flow rate of a viscous fluid even before it becomes blocked. This blockage can increase the back pressure (or vacuum) of the system, and thus the work a pump must do.

Regardless of the means employed to mobilize the fluid containing insoluble particles, in the present invention the particles sought to be removed from a flowing fluid are macroscopic particles generally larger and/or more massive than the microscopic and/or small macroscopic particles sought to be removed by the average automotive fuel filter.

The present invention may be useful in various activities in which a flowing fluid may contain macroscopic particles. For example, in civil emergencies such as floods, debris flows and hurricanes pumps are often used to drain water from flooded ground or structures, the wastewater may carry debris, stones, and small objects which may injure the pump mechanism unless removed from the fluid before reaching the pump. Similarly, bilge pumps are used to drain the bilges of ships, sewage pumps are often used to empty septic tanks and portable toilets and the sewage tanks of ships and boats at flow rates measuring in the tens of gallons per minute or more.

In these and other uses it is not uncommon that heavier, non-buoyant materials including items such as debris, screws, bolts, nuts, nails, coins, stones, gravel and other relatively heavy objects that are present in, or have fallen into, the fluid sought to be moved are entrained in the pump's inflow, unintentionally or intentionally, and transported toward the pump. These hard, potentially sharp objects can cause expensive damage to a pump, which must be replaced or repaired before it is again available to perform its work. In the meantime, serious and sometimes irreparable consequences may result from the consequential downtime, damage and/or contamination of such pumps.

Damage may be caused to the parts and machinery of a pump of any construction in this way. A type of pump commonly used for generating fluid flow is a peristaltic pump, which functions by using as rotating rotor component to sequentially compress, then release a flexible tube or other flexible conduit, thus urging the fluid forward like toothpaste in a tube. Solid body particles such as screws, rocks, bolts, nails, coins and the like may easily block and/or shred the tubing or become lodged in the pump machinery, causing the pump to stop functioning. If the tubing is punctured by the solid body particles the fluid may leak or be emptied within the pump body. If the fluid is toxic, corrosive or biohazardous (such as is the case with sewage) such leakage may have dangerous and potentially disastrous consequences.

Moreover, the costs involved upon only a single occurrence in which a solid body particle is swept into the pump can amount to hundreds or thousands of dollars, or may require the replacement of the entire pump with attendant labor costs. Even medium sized sewage pumps of this sort can cost many thousands of dollars.

While prevention of damage to a pump by solid body particles in a flowing fluid is one problem solved by the present invention, the flowing fluid need not be mobilized by a pump in order for the particle separator of the present invention to be useful. The flowing fluid may be mobilized by gravity or a fan, for example, or by any other effective means.

Thus, for example, the enrichment of either or both the fluid and solid body particles (such as when processing metal ore or enriching a gas stream) is another or alternative problem addressed and solved by the present invention. The invention is therefore broadly drawn to methods and apparatus for removing such solid body particles mixed in a flowing fluid contained in a conduit, such as a pipe, hose, channel or tubing.

When used in conjunction with a pump, the apparatus of the present invention is placed in the fluid line at a location upstream of the pump. By "upstream" of the pump is meant that the location is between the fluid source and the pump.

By "comprised of" is meant that the indicated composition or material contains or "consists of at least" the given components.

By "solid body particles" or "SBPs" is meant one or more solid object immersed and/or suspended in the fluid, having a mass greater than the mass of the fluid it displaces, and having a size sufficient to enter a fluid inflow line of a pump. In some embodiments an SBP may preferably have a weight equal to or greater than about 0.7 g, or equal to or greater than about 1 gram, or equal to or greater than about 2 grams, or equal to or greater than about 2.5 grams or more. In preferred embodiments may be contained in the fluid flow in a fluid inlet conduit directed to the fluid inlet side of a pump.

In a first embodiment the invention comprises a particle separator structured to remove SBPs from a fluid flow. The particle separator comprises a fluid inlet port, a vessel (such as, in some embodiments, a capped section of conduit) comprising a void or lumen, and a fluid outlet port. Each of the fluid inlet port and the fluid outlet port is adapted to respectively join to a fluid line inlet conduit and a fluid outlet conduit (each of which may comprise a tube, hose, pipe, channel or other conduit) without leakage between the fluid inlet and outlet conduits and the fluid inlet port and fluid outlet port, respectively.

Very preferably, the fluid inlet port and the fluid outlet port of the particle separator are arranged so that the direction of fluid flow in the fluid inlet conduit through the fluid inlet port is at least approximately oriented in a generally horizontal orientation (parallel to the plane of the horizon); preferably varying by an angle of no more than about ±45°, or ±30°, or ±15° from the horizontal.

By "horizontal" as used herein is meant parallel to the plane of the horizon when viewed at sea level.

Between the fluid inlet port and the fluid outlet port of the particle separator is structured an elongated vessel component defining a vertically elongated lumen or void therewithin; the vessel component is arranged approximately perpendicularly to the substantially horizontal orientation of fluid inlet flow.

In this embodiment the vessel component comprises a top (or upper) portion in which the lumen may (but need not) extend above the entry points of the fluid inlet port and the fluid outlet port, a "middle" portion defined by the general area of the vessel component comprising the entry points, and a bottom (or lower) portion below these fluid entry and exit points. In preferred embodiments the top and middle portions of the vessel component define a lumen segment having a substantially similar or identical diameter. In many preferred embodiments the bottom portion of the vessel component defines a lumen segment having a larger diameter than the lumen segment of the middle portion.

Furthermore, the function of the top portion of the vessel component in the present example is largely to provide a convenient but non-exclusive way of stabilizing a tongue component (discussed below) within the lumen, using commonly available conduit and fittings. The top portion of the particle separator may therefore in certain embodiments simply comprise a water-tight cap at the top end of the particle separator above and close to the fluid outlet and outlet ports that functions to hold and position a tongue component within the lumen. Preferably, the water-tight cap is removable to permit access to the tongue component for repair, positioning, or replacement purposes. The tongue component and its placement within and coordination with the vessel component is described in detail below.

In some embodiments the present invention may comprise a pump/particle separator assembly ("PPSA") comprising a pump component having a first fluid outlet port and a first fluid inlet port and a particle separator component comprising a second fluid inlet port and a second fluid outlet port. The particle separator component is arranged to be situated upstream from the pump component, and is fluidly joined to the pump component, so that the second fluid outlet port of the particle separator component is directly or indirectly fluidly joined to the first fluid inlet port of the pump component. Fluid entering the second fluid inlet port passes through the particle separator component, where SBPs suspended or carried in the fluid flow are retained within the lumen, and the resulting fluid, depleted of SCPs, passes out the second fluid outlet port, enters the pump component's first fluid inlet port and is pushed out the pump component's first fluid outlet port to the fluid destination (usually through a hose or other conduit), which may be, for example, a holding tank or a container for transport to another location.

Some PPSAs may be fabricated as part of the pump unit. In such cases, the particle separator may be a separate component within the same or a different housing as the pump component; preferably the particle separator component is contained within the same housing. In some embodiments the PPSA may be fabricated as a single unit. In some embodiments the particle separator may be cast or molded as a part of the pump component. For example, some or all of the lumen, the second fluid outlet port and/or the second fluid inlet port of the particle separator may be cast within one or more blocks, such as metallic or polymeric blocks, with removable, fluid-tight access to the lower portion of the particle separator in order to remove SBPs retained within the lumen and preferably removable, fluid tight access to the top portion of the lumen so as to service, position, or replace the tongue component, if necessary.

In PPSAs the pump component may be of any operable construction, as may be suitable for the intended purpose. For example, in some embodiments the pump assembly may be a sewage pump assembly, or a bilge pump assembly. In a preferred but non-exclusive embodiment the pump is a peristaltic pump. However, regardless of the mode of operation of the pump in question, the particle separator of the present invention will operate to prevent SBPs from entering the fluid flowing into the pump component (or its own components, such as the tubing of a peristaltic pump) itself, thereby protecting the mechanisms of virtually any type of pump.

Then used in conjunction with a pump the particle separator component is placed between the fluid source and the pump, and must be structured to operate substantially without leakage under negative pressure. Moreover, the particle separator component must be able to withstand operation at flow rates suitable to the flow rate of the pump component with which it is paired. For example, when a sewage pump is installed in a marina sewage pump-out station, the flow rate of the pump is commonly between about 30 and about 100 gallons per minute. It is important that the particle separator be constructed in a manner, and of materials, such that it is stable and water-tight under the anticipated conditions of fluid flow and pressure.

In one or more embodiments of the invention the top portion of the particle separator may be eliminated in part or in whole, and the tongue component stabilized within the lumen using different methods, such as, without limitation, by fastening the tongue component within the lumen using, for example, a pair of opposing, vertical retaining grooves located on the inside walls of the vessel component, by inserting the tongue component upward within the lumen from the bottom portion of the vessel component into the middle portion, and stabilized or securing the tongue component therewithin. Further, the particle separator may be manufactured to have fewer (or more) separately manufactured components than the examples provided herein. Furthermore, the tongue component may in some cases be molded as part of the vessel component or a an interior-facing part of a top portion capping one end of the vessel component.

In the particle separator embodiments exemplified herein the vessel component is comprised of one or more length of pipe or other conduit, each of which preferably has has an inner cross-sectional area substantially equal to or, particularly in the bottom portion of the vessel component, preferably greater than twice the inner cross-sectional areas of each of the fluid inlet port and the fluid outlet port. However, it will be understood that in other embodiments the vessel component of the particle separator may be comprised of any suitable materials such as, without limitation, a metal, a metal alloy, or a polymeric material. In some cases the vessel component may be assembled in segments (such as by gluing, welding, or cementing, or by employing unions or joints such as cam-lock junctures). In some cases the vessel component may be wholly or partially molded or cast as a single object. In this context, by a "single object" is meant to optionally exclude the tongue component and/or the removable cap which holds the tongue component at the top of the vessel component and/or the removable cap at the bottom portion of the vessel component, in which SBPs in the fluid flow are retained during operation; these items may be separately fabricated and then joined to the vessel component.

The vessel component is structured to be fluid-tight with the exception of the fluid entry and exit locations: e.g., the fluid inlet port and the fluid outlet port. In this way the velocity of the fluid flow within the lumen is not increased (and may preferably be temporarily decreased within the lumen at the bottom portion of the vessel component) while flowing through the particle separator device, as will be described below.

The fluid inlet port and fluid outlet port may have inner diameters substantially identical to, or slightly smaller or larger than, the inner diameters of the fluid inlet conduit and the fluid outlet conduit, respectively. The fluid inlet port may comprise a short length of curved conduit (or comprise an inlet portion of a conduit junction) structured to direct fluid flow downward into lumen of the bottom portion of the vessel component at a curve resulting in alteration of the direction of water flow of approximately 90°, while the fluid outlet port may comprise a similar length of curved conduit (or comprise an outlet portion of a conduit junction) structured to direct fluid flow from the bottom portion of the lumen upward at a curved angle of approximately 90° to meet the fluid outlet conduit through the fluid outlet port.

Those of skill in the art recognize that while the present description refers to features such as conduits and the lumen having internal "diameters", it is not necessary that any or all of these features have a circular cross-section. Thus, unless otherwise stated or clear from the context, the term "diameter" herein means one or more structural dimensions sufficient to provide at least a rough measure of the cross-sectional area and/or volume of the referenced feature. In some examples cross-sections of the vessel component (with the exception of the fluid inlet and outlet ports) show that the lumen of the vessel component is substantially symmetrically shaped at any point along its length top to bottom. In currently preferred embodiments the lumen has a substantially circular cross-section at any position from top to bottom along the vertical axis of the vessel component. The centers of these stacked circular cross-sections define a vertical "centerline" of the lumen. This construction helps ensure that fluid flow through the particle separator component is uniform and, except for the "U" turn the fluid makes in the bottom portion of the particle separator is laminar, rather than turbulent, in nature.

As used herein, the term "substantially symmetrical" or "substantially equal volumes" with reference to the shape or area of a horizontal cross-section of the hollow portion (or inner diameter) of the top portion, the middle portion, the expender reducer component, the bottom portion, or the lumen, or a volume of the lumen (or a portion thereof) means that any straight line passing through the center of the cross section divides the shape, area or volume into two parts in which the shape, area or volumes are substantially identical or chiral. In this context, "substantially" means differing by no more than 10%, or no more than 5% or no more than 3%, or no more than 1%. Similarly, "substantially equal volumes" also means differing by no more than 10%, or no more than 5% or no more than 3%, or no more than 1%.

Some or all of the vessel component, the fluid inlet port and the fluid outlet port comprised in the middle portion of the vessel component of the particle separator, may each be separately fabricated and then joined or may, as in the prototypes of the present examples, be fabricated as a single structure, such as is seen in the common "double sanitary tee" sewer junction having curved inlets and outlets; such fluid fittings are widely available. By "middle portion" is meant the portion of the vessel component located between the top portion and bottom portion of the vessel component and extending either to the bottom portion or, when an expander/reducer portion is used, to the top of the expander/reducer portion. In some embodiments the entire particle separator except perhaps the tongue component and the removable second cap, each discussed below, may be fabricated as a single structure, e.g., by injection molding or other fabrication methods.

In some embodiments of the invention the top portion, middle portion, and/or the bottom portion of the vessel component may comprise sections with each section independently having a lumen segment of the same or different inner diameter as the lumen located in the middle portion of the vessel component. In a preferred embodiment the top and middle portions have substantially equal inner diameters. In a preferred embodiment the bottom portion has a larger inner diameter than the middle portion.

In the embodiments shown in the examples a tongue component is secured to the top portion, extends through the lumen of the middle portion of the vessel component, and extends slightly into the lumen in the bottom portion of the vessel component. The tongue component comprises a length of a hard material such as (without limitation) a metal or metal alloy, wood, or as presently preferred, a tough, but slightly flexible polymer such as high-density polyethylene (HDPE). In each case, the tongue component preferably has a width substantially equal to the inner diameter of at least the middle portion of the lumen. When viewed from the top or bottom, the tongue component very preferably bisects the volume of the segment of the lumen through which it extends into two volumes, each such volume being approximately equal to or greater than that of the inlet fluid conduit. The tongue component extends downward within the lumen to a point at least somewhat within the lumen of the bottom portion of the lumen. Preferably the tongue extends into the lumen of the bottom portion by a distance in the range of from about 0.5 inches to about 3 inches, or more preferably about 1 inch. Thus, at least the lower bottom portion of the lumen is undivided by the tongue component.

Very preferably, the lumen of the vessel component through which the tongue component extends (e.g., at least a portion of the middle portion, the transitional expander/reducer portion (if present) and at least a portion of the bottom portion) is sufficiently symmetrically-shaped in horizontal cross-section that the two substantially equal volumes are respectively contained within a first lumen section and a second lumen section, the shape of each of which is substantially superimposable on, or chiral to, the other. By "chiral to" is meant that the cross sectional shape of the first and second lumen sections are mirror images of each other. Desirable laminar fluid flow in each of the first and second lumen sections is thus maintained at substantially equivalent flow rates, respectively, while minimizing turbulent flow, thereby maximizing the fluid flow rate through the particle separator.

In some embodiments the tongue component is elongated and preferably approximately rectangular, and may be any suitable length sufficient to direct substantially all of the fluid inlet flow to the bottom portion of the particle separator and to extend at least partway into the bottom portion of the lumen, but in no event all the way to the bottom of the lumen. Additionally, in some preferred embodiments the particle separator lumen may have a width or diameter about 10-15 times the thickness of the tongue. In some embodiments the tongue component may not be rectangular, but may have sides tailored to a varying width and/or conforming to the interior width of the middle portion the expander/reducer portion (if present) and optionally at least part of the bottom portion of the lumen. Very preferably the tongue component is positioned to extend from the center of the top cap of the particle separator and substantially through the center or origin of the cross sections of the inner diameter of the lumen.

The tongue component is firmly secured so as to extend lengthwise (along an axis substantially parallel to the top-to-bottom axis of the particle separator) within the lumen so as to bisect the volume of the middle portion of the lumen at the locations in which it is placed. In some embodiments, the tongue component may be joined at its top end to a first cap component (the "top cap") covering and sealing the top section of the lumen. The lower tip of the tongue component extends along and very preferably through the middle portion of the vessel component and the lumen of the expander/reducer portion (if present) extending into the lumen of the bottom portion preferably by at least about 0.5 to 3 inches. The bottom of the lumen is sealed by a fluid-tight second cap component (the bottom cap), which is removable from the particle separator, for example, by unfastening or unscrewing the bottom cap from the vessel component, loosening a clamp, or any other effective method.

The preferred embodiments of the particle separator of the present invention may be made of any suitable material, such as, without limitation, a metal (e.g. steel, bronze or copper) or a polymer (e.g., polyvinyl chloride (PVC) or acrylonitrile butadiene styrene (ABS)). Any separately fabricated parts may be joined using any methods suitable under the circumstances to maintain a fluid seal and render the device sufficiently strong for its intended use. For example, such methods may, without limitation, include one or more of gluing, welding, soldering, using threaded ends and gaskets, union junctions, or using a flexible sleeve secured with hose clamps or camlock fittings. In other embodiments the particle separator may be wholly or partially cast, molded or otherwise formed in one or (preferably) a plurality of parts; these methods of joining may still be used to connect the particle separator to the fluid inlet conduit and the fluid outlet conduit.

While Applicant does not wish to be limited by theory, it appears that when fluid flow is initiated, the fluid and suspended/dispersed SBPs are swept into the particle separator through the downwardly angled or curved fluid inlet port. When the flow enters the middle portion of the lumen of the vessel component, the flow is diverted downward by the tongue component into the bottom portion thereof. Once the fluid flows past the "tip" of the tongue component extending at least partway into the bottom portion of the lumen, the fluid flow then exits the device by flowing upward along the other side of the tongue component to the fluid outlet port and then to the fluid outlet conduit.

The diameter of the lumen is preferably selected to have a minimum inner cross-sectional area at least substantially equal to twice the inner cross-sectional areas of each of the fluid inlet conduit and the fluid outlet conduit.

In preferred embodiments, the bottom portion of the vessel component may be structured to comprise an "expander" (also called a "reducer" or an expander/reducer) portion, in which the inner diameter of the lumen increases in the direction from top to bottom. The expander/reducer ay be fabricated as part of the vessel component or a segment thereof. The prototype examples provided here, the expander/reducer may comprise, without limitation, a length of conduit linking the middle portion of the vessel component to the bottom portion thereof. In other embodiments, the expander/reducer component may be part of the vessel component in which the top, middle, expander/reducer and/or bottom portions of the particle separator are cast or molded as a single unit.

In this embodiment the bottom portion of the vessel component is structured to have a larger inner diameter than the middle portion, thereby expanding the lumen in the bottom portion as compared to that of the middle portion. The expander/reducer component is therefore a portion of the vessel component located between the middle portion and the bottom portion. The volume of the lumen is thereby expanded by the expander/reducer when observed from the direction from the middle portion to the bottom portion of the vessel component, and reduced by the expander/reducer when observed from the direction from the bottom portion to the middle portion of the vessel component. As used herein the terms "expander", "reducer" and "expander/reducer" shall have the same meaning, referring to the length of conduit linking the middle portion of the vessel component to the bottom portion thereof, as described herein.

In horizontal cross-sections of the expander/reducer taken along its length the lumen is very preferably substantially circular in shape. Preferably in horizontal cross-sections of the expander/reducer taken along its length the lumen is substantially symmetrical in shape such that when bisected by the tongue component the resulting first lumen section and second lumen section have two substantially equal volumes thereby maximizing, rather than potentially limiting, the throughput of fluid passing through the particle separator without obstruction. In the example shown in Example 2 the expander/reducer has a top end that is received by, or receives, a portion of the vessel component (or a linking length of conduit) having a first diameter or cross-sectional area substantially identical to that of the lumen in the middle portion of the vessel component. The expander/reducer has a bottom end that is received by, or receives, a portion of the vessel component (or a linking length of conduit) having a second diameter or cross-sectional area larger than that of the first diameter of cross-sectional area. Those of ordinary skill will recognize that the expander/reducer may have an inner diameter at a first end which is slightly smaller, slightly larger, or the same as the middle portion of the vessel component and an inner diameter at a second end which is slightly smaller, slightly larger, or the same as the bottom portion of the vessel component. In this context the term "slightly smaller" means sufficient to fit within the indicated portion of the vessel component to make a fluid-tight connection. In the same context the term "slightly larger" means sufficient to fit around the indicated portion of the vessel component to make a fluid-tight connection. In preferred embodiments the transition of the expander/reducer from the diameter of the first end to the diameter of the second end is a smooth linear transition. In other embodiments, the expander reducer may be a continuous part of the vessel component that serves to connect the lumen of the middle portion with the larger diameter lumen of the bottom portion.

The tongue component may optimally be positioned within the lumen to extend 0.5-3 inches into the bottom portion, past the transition from the smaller diameter cross-section to the larger diameter cross section of the lumen of the expander component. Thus, if the rates of a non-compressible fluid entering and exiting the particle separator are equal to each other and constant, the velocity of the fluid flow will increase as a function of decreasing the area of the cross section of the conduit containing the fluid, and vice versa.

In currently preferred embodiments the tongue component may be designed so that its sides touch, or almost touch, the side walls of the lumen through which it extends. Thus, when the bottom portion of the vessel component has a larger diameter than the middle portion (as described immediately above), the bottom part of the tongue that extends into the bottom portion of the vessel component may be wider than the upper part of the tongue. As a consequence, during the assembly of these prototype embodiments the tongue component is preferably inserted into the lumen from the bottom of the particle separator and fastened (such as by cementing, gluing and/or screwing) through grooves or holes in the top cap.

With other factors being held constant, the velocity of a suspension comprising SBPs in a fluid (such as water) will decrease inversely with enlargement of the diameter or cross-sectional area of the vessel component (or section thereof) containing it. This means that the flow rate of the fluid entering the bottom portion of the vessel component will be decreased as a function of the increased diameter of the bottom portion.

Thus, the rate of the generally U-shaped fluid flow around the tip of the tongue component will be less than the flow rate of the fluid entering (or leaving) the particle separator, making it more likely that the inertia of the suspended SBPs in the fluid flow, being directed downward and then losing momentum as the flow rate decreases towards the bottom portion of the vessel component, and that the SBPs, aided by gravity, will fall into the removable second (bottom) cap without being swept into the fluid flow around the tip of the tongue component. In some preferred embodiments the tip of the tongue component may be curved or angled to direct flow to the "inlet" side of the bottom portion.

Once the fluid flow streams around the tongue component the fluid flow (now free of suspended SBPs) is directed upward and then accelerated as it enters the expander/reducer in the "reducer" direction and is directed out the fluid outlet port into the fluid outlet conduit. The SBPs are deposited in the removable second (bottom) cap at the bottom of the vessel's lumen, where they may be collected and removed from the particle separator as desired.

Those of ordinary skill in the art will immediately see that the particle separator of the present invention has wide and numerous applications in any fields in which contamination of fluid flow by SBPs is a problem, or in which a facile and inexpensive way of collecting and enriching SBPs in a fluid flow, such as mining applications, such as, without limitation, gold or silver or diamond mining. For example (and without limitation), the particle separator of the present invention may be useful in the gas industry for cleaning gas flow containing SBPs, such as in gas effluent from gas wells or in downstream processing; in the oil well effluent from hydraulic fracturing and shale oil mining; for environmental remediation, and in mining, such as gold and silver mining, as well as many other possible uses.

The components of the particle separator of the present invention may be made of any material suitable for the purpose. Thus, in many applications (such as plumbing and home construction fields) components comprising the particle separator may be made of a polymer such as, without limitation, polyvinyl chloride (PVC), acrylonitrile butadiene styrene (ABS), acrylonitrile styrene acrylate (ASA), and the like.

In other applications of the present invention components of the particle separator parts may, without limitation, be made of metal (such as iron, copper, bronze, stainless steel and the like), a ceramic, and/or a clay instead of, or in combination with, a polymer.

Additional embodiments are described in the examples that follow. These embodiments do not limit the scope of the invention, but merely provide additional description of the particle separator claimed herein.

BRIEF DESCRIPTION OF THE DRAWINGS

FIG. 1 is a cross-sectional depiction of an embodiment of the particle separator of the present invention.

FIG. 2 is a depiction of an embodiment of the particle separator of the present invention, showing the fluid inlet conduit and the fluid outlet conduit unattached.

FIG. 3 is a depiction of the embodiment of the particle separator shown in FIG. 2, with the fluid inlet conduit and the fluid outlet conduit not shown, and showing the bottom removable second cap of the invention unattached.

FIG. 4 is a depiction of the embodiment of the particle separator shown in FIG. 2, with the fluid inlet conduit and the fluid outlet conduit, and the bottom removable second cap of the invention not shown, and showing the top first cap partly removed and the tongue component partly exposed.

DETAILED DESCRIPTION OF THE INVENTION

Example 1

Figure 1:
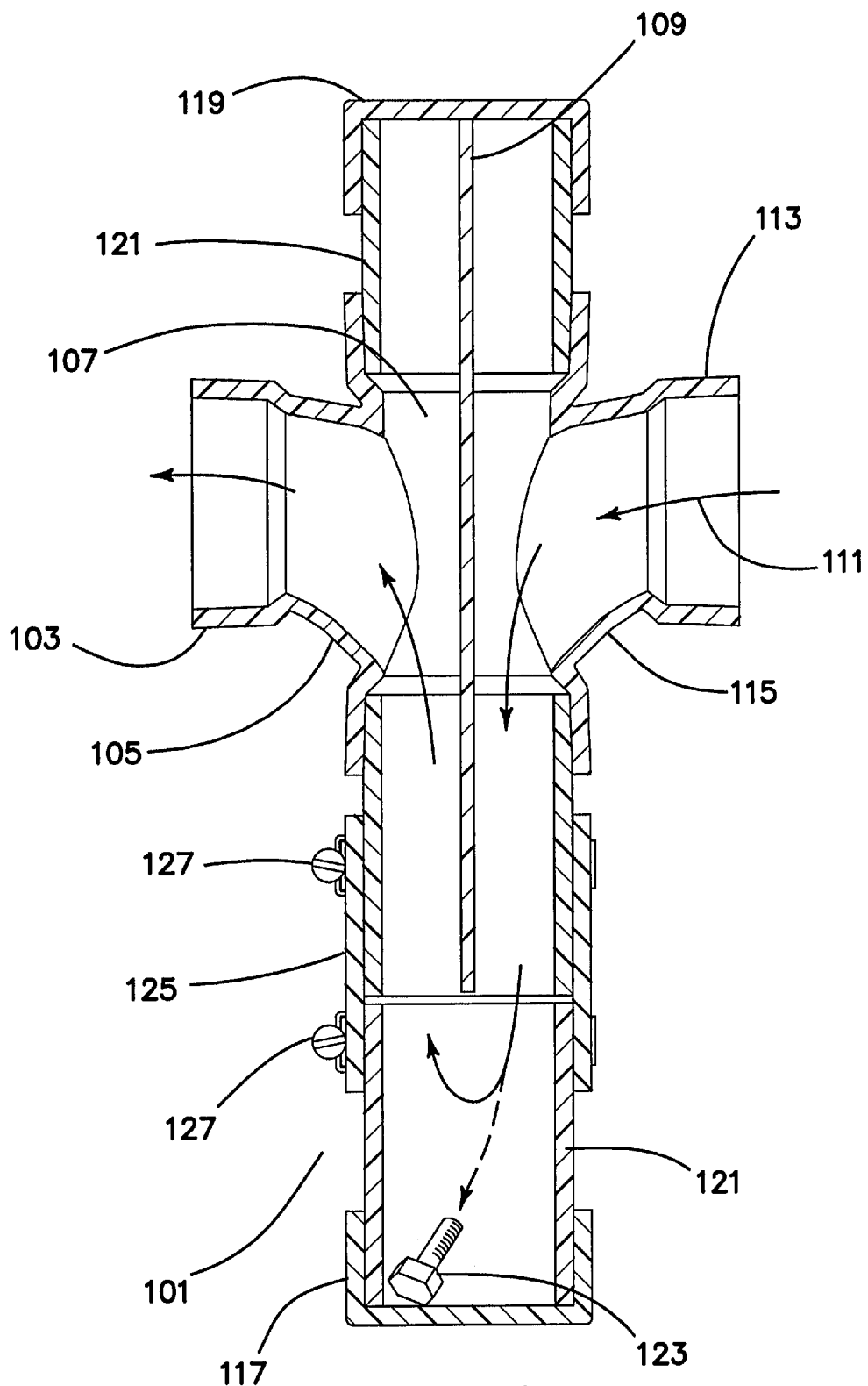

FIG. 1 shows a representative particle separator 101 of the invention in cross-section. A portion of the fluid inlet conduit 113 is shown connected to the fluid inlet port 115; the direction of fluid flow is shown as 111.

In this embodiment fluid inlet port 115, fluid inlet conduit 113, fluid outlet conduit 103 and fluid outlet port 105 each have inner diameters of 2 inches. Fluid inlet conduit 113 and fluid outlet conduit 103 comprise rubberized hosing material in this embodiment, but one or both of these conduits may be a rigid conduit instead, made of any material suitable and effective for the purposes required and under the conditions of use as desired.

The fluid inlet port 115 directs fluid flow 113 into the lumen component 107 of vessel component 121. The lumen component, cylindrical in this embodiment, may be defined by one section or a plurality of sections comprising the vessel component 121.

The particle separator 101 also comprises removable second cap 117 located at the bottom of the lumen, and top first cap 119. As shown in the embodiment of FIG. 1, the second cap 117 is removably joined to the vessel component 121 by a sleeve 125 comprising flexible rubberized hosing, and held in place with hose clamps 127. A bolt 123, carried in the fluid flow 111 is shown as having been retained within the second cap 117 as the flow is directed upwards and through the fluid outlet port 105.

In this example, the fluid inlet port, the fluid outlet port and the vessel component were obtained as a single fitting made from an acrylonitrile butadiene styrene (ABS) copolymer in which the diameter of the lumen is 3 inches and the diameters of the fluid inlet port and the fluid outlet port are each 2 inches. The part was Part No. 4229, "Double Sanitary Tee, Reducing", purchased from Charlotte Pipe and Foundry Company®, 1335 S Clarkson St., Charlotte, N.C. 28208. Applicants have found in subsequent testing that the use of a stronger polymer, such as polyvinyl chloride (PVC), appears more stable and robust under pressure, whether negative pressure or positive pressure.

Those of ordinary skill in the art will recognize that there exist many other ways of rendering second cap 117 removable, such as by the use of threading on the exterior of the vessel component 121 and inside of the second cap 117, optionally in conjunction with a compressible seal or gasket (not shown).

The first cap 119 is joined to and firmly holds tongue component 109 (seen here in profile) facing in a downward orientation. As shown in profile, the tongue component 109 bisects the lumen 107 to form two substantially equal volumes in the upper portion of the particle separator lumen 107. Thus, in this embodiment the tongue is rectangular with a width of 3 inches or slightly less, and a length of about 13 inches, effectively separating fluid flows within the lumen 107 of the particle separator 101.

As indicated above, in this embodiment the diameter of the lumen is 3 inches; thus, the cross-sectional area of the lumen is $A=\pi r^2$ or $3.14\times(1.5)^2$, which equals $3.14\times2.25$, or 7.07 square inches. The cross-sectional area of the fluid inlet port 115 and fluid outlet port 105 are identical; these ports have a diameter of 2 inches, so the cross-sectional area of each is $3.14\times(1.0)^2$ or 3.14 square inches.

Thus, as a non-limiting example, when the upper portion of the lumen 107 is bisected by the tongue component 109 into two equal portions, with each portion having a resulting cross-sectional area of (7.07 square inches, minus the cross sectional area of the tongue component 0.75 square inches=6.32) divided by 2, or 3.16 square inches. This is very slightly larger than the common cross-sectional areas (3.14 square inches) of the fluid inlet port 115, the fluid outlet port 105, the fluid inlet conduit 113 and the fluid outlet conduit 103. As a result, in this example the flow rate of fluid as it enters and exits the particle separator is about equal to, or slightly greater than the flow within the particle separator during operation.

In this embodiment the lumen 107 is extended and completed using lengths of ABS pipe having a 3 inch diameter joined to the upper portion of the lumen and the lower portion of the lumen, and capping off the ends of each such length with the upper first cap and the lower, removable, second cap, each of which is structured to fit and seal the ends of 3' conduit.

All junctures between the ABS pipe and first and second caps is rendered watertight. The first cap may be affixed to the end of the lumen by any appropriate means, including In this prototype, a flexible rubberized hose sleeve is used in conjunction with hose clamps to keep the removable second cap in place during operation, and upon loosening of the hose clamps, to permit the second cap to be removed from the particle separator.

Figure 2:
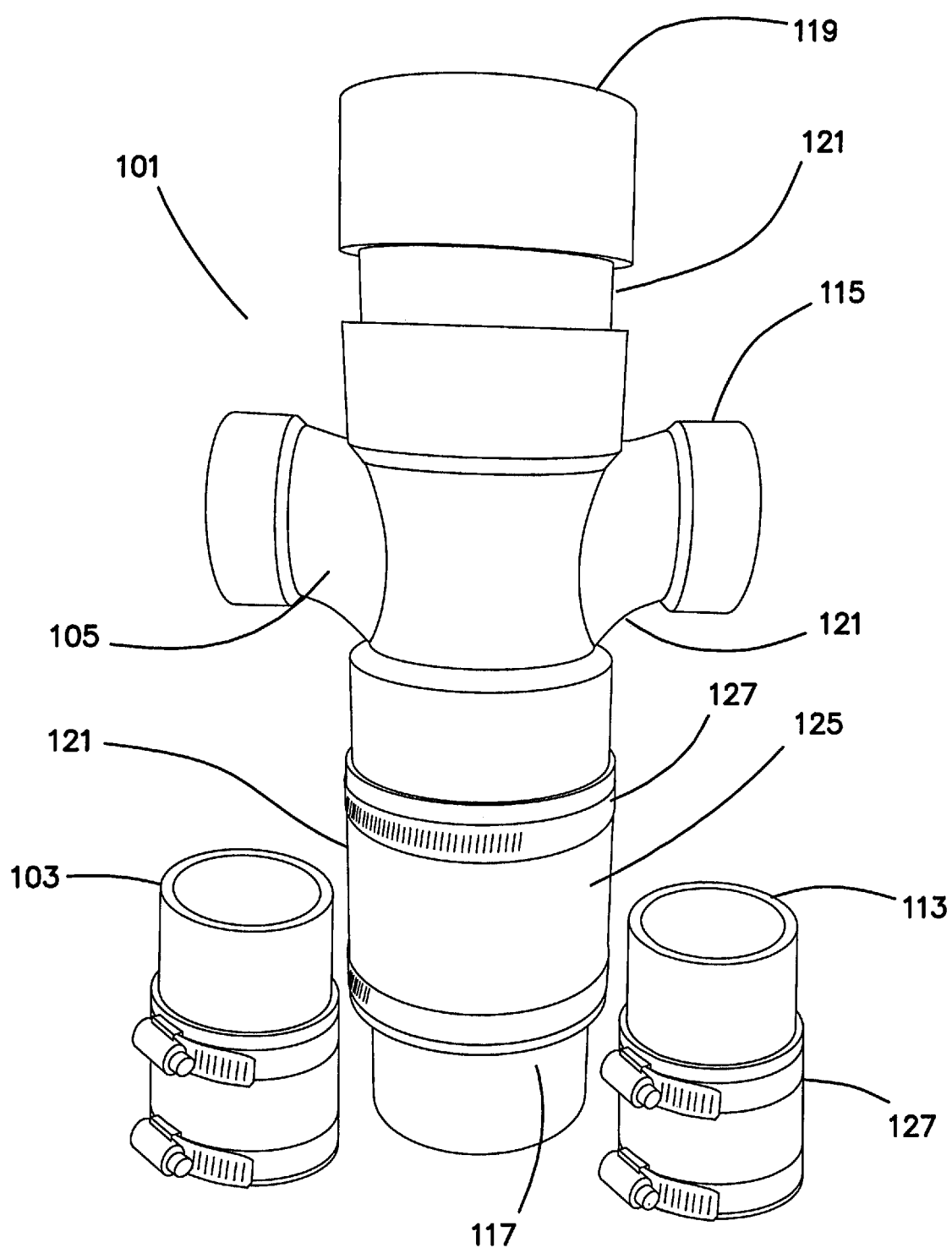

Turning now to FIG. 2 a view of an embodiment of the particle separator 101 is shown in profile. First top cap 119 is joined to a first length of pipe comprising part of the exterior surface 121 of the vessel component. Fluid inlet port 115 and fluid outlet port 105 are joined to the central portion of the vessel component as a single molded fitting. Bottom removable second cap 117 is joined to a second length of pipe to the vessel component 121 using a length of rubberized hose 125 and hose clamps 127. Segments of fluid inlet conduit 113 and fluid outlet conduit 103 are shown disconnected to the particle separator 101; in this prototype these are glued to their respective ports 115 and 105.

In FIG. 3, the particle separator 101 is shown with the bottom, removable, second cap 117 removed therefrom by loosening of the upper hose clamp 127. The second cap 117 is still joined by the lower hose clamp to a length of pipe comprising part of the vessel component 121 defining the lumen 107. Loosening the bottom hose clamp 127 permits the cap to be removed entirely from the assembly.

FIG. 4 shows the particle separator 101 with the bottom portion (shown on the left of FIG. 3) entirely removed, and the upper first cap 119 and the upper portion of the vessel component 121 comprising an extension of the lumen 107 partially removed from the central part of particle separator 101. Tongue component 109 is exposed to show that the tongue component extends across the inner diameter of lumen 107.

Figure 5:
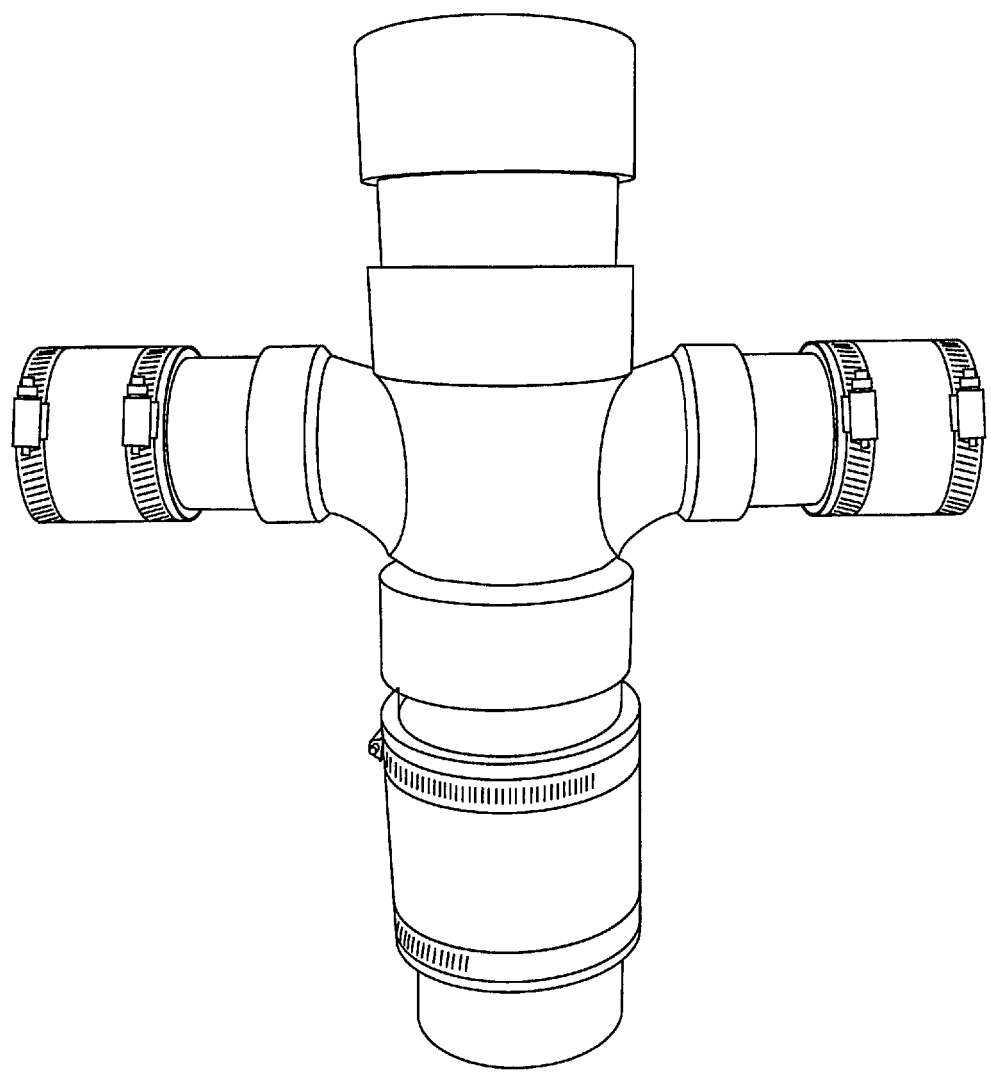
FIG. 5 is a depiction of the embodiment of the particle separator shown in FIG. 2, with the fluid inlet conduit and the fluid outlet conduit are attached.

FIG. 5 shows the particle separator of FIG. 2 with the fluid inlet conduit and fluid outlet conduit attached thereto.

Figure 6:
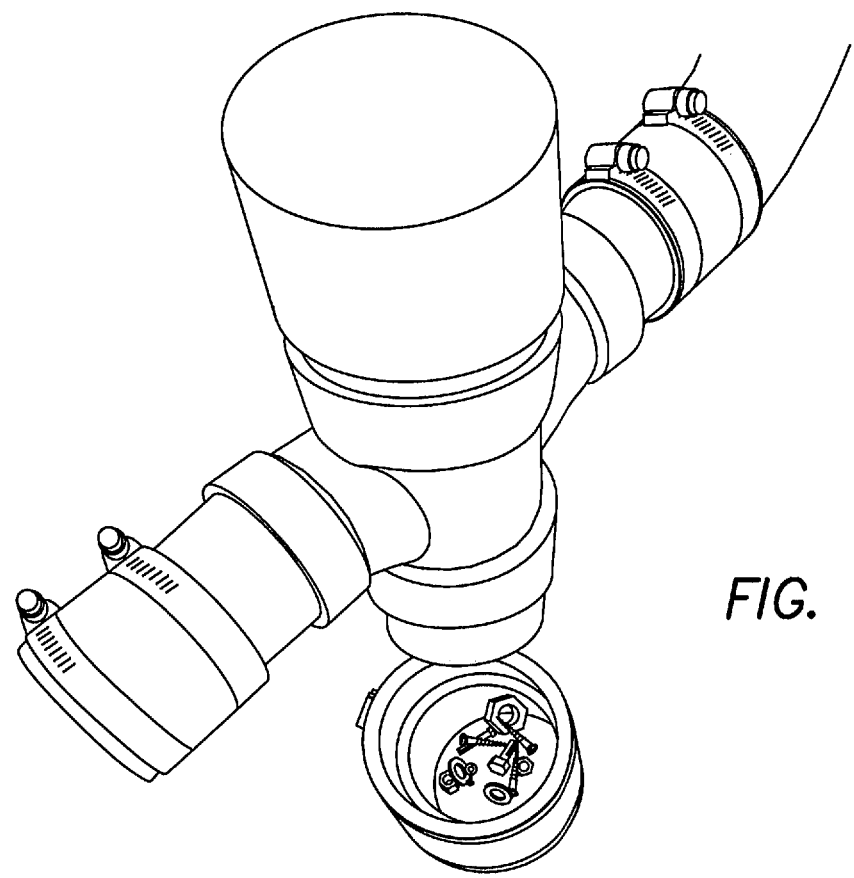
FIG. 6 is a depiction of the embodiment of the particle separator shown in FIG. 2, in which an experiment has been concluded, and showing the SBPs including nuts, bolts and screws, separated from a water flow at 40 gallons per minute, contained in the bottom removable second cap of the particle separator.
Figure 7:
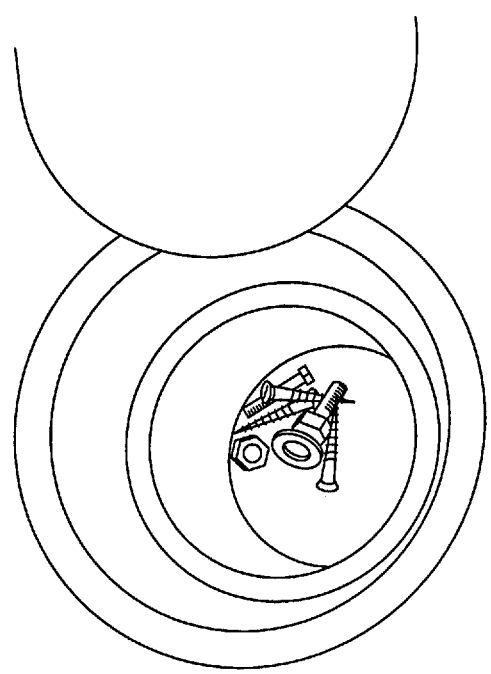
FIG. 7 is a close-up of the bottom removable second cap of the particle separator shown in FIG. 6.

FIG. 6 shows the results of testing the prototype by passing water and a variety of SBPs (metal screws, bolts, nuts) through the fluid inlet port of the particle separator at a flow rate of 40 gallons per minute. The fluid exiting the fluid outlet port contained no RBPs. Following the test, the bottom removable second cap 119 was removed. All of the tested RSBPs were retained within the second cap. FIG. 7 is a close-up of the bottom removable second cap 119 and retained RBPs.

Example 2

Figure 8:
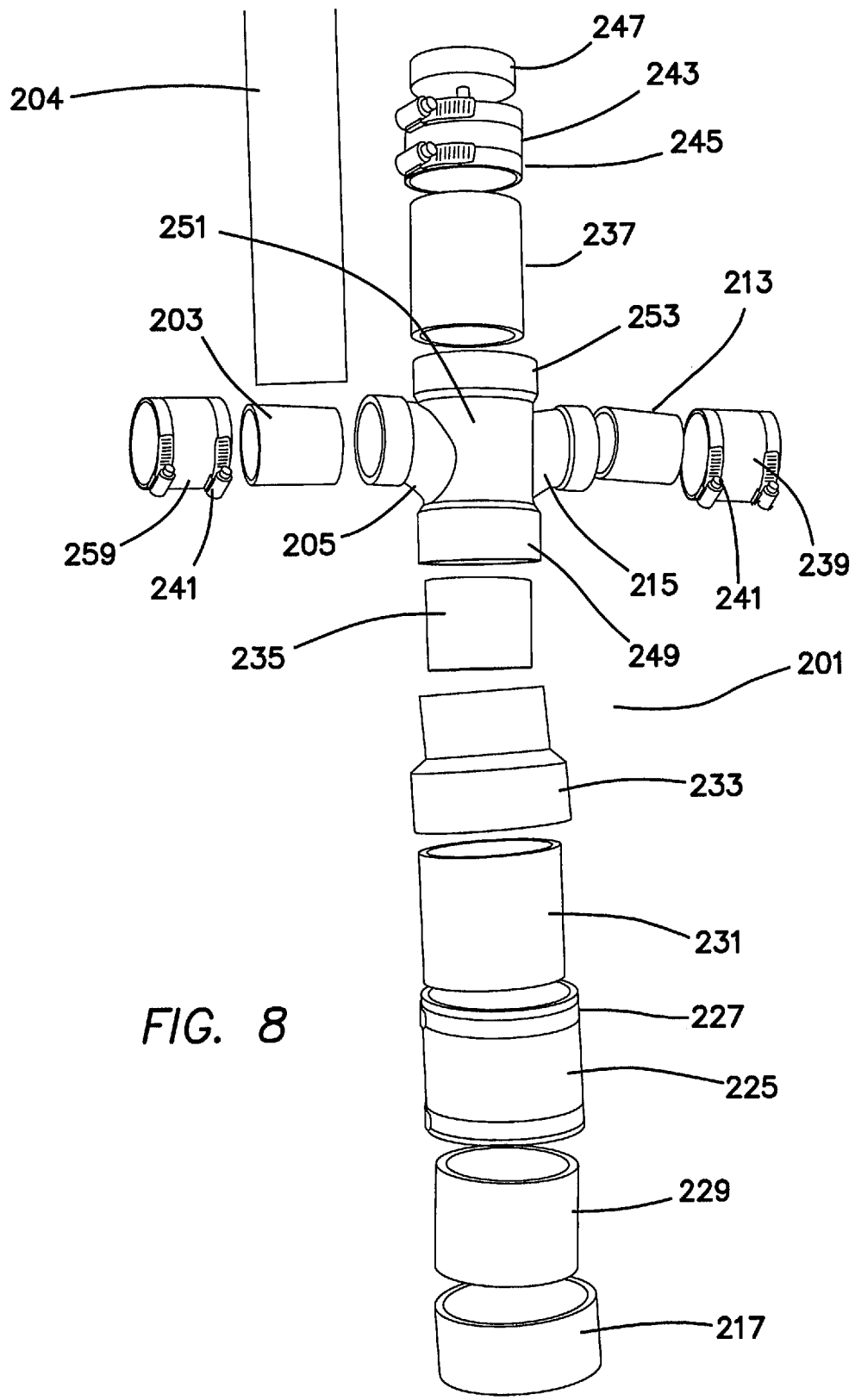
FIG. 8 shows an exploded view of another embodiment of the particle separator.

FIG. 8 shows another embodiment of the invention in an exploded view. The particle separator 201 comprises bottom second cap 217 having an inner diameter structured to snugly receive a first conduit component 229; in this case the inner diameter of the first length of conduit has an inner diameter of 4 inches and a length of 3 inches, and is constructed using ABS thermoplastic. Also, in this case, the bottom second cap 217 is cemented to the first conduit component 229 using ABS cement comprising acetone and dissolved and suspended ABS fiber.

The first conduit component 229 is joined using hose clamps 227 and a flexible hose sleeve 225 in a fluid-tight manner to a second conduit component 231 (in this case, also made of ABS polymer) preferably having the same inner diameter as the first length of conduit. In this embodiment the second conduit component 231 has a length of 4 inches. The flexible hose sleeve 225 preferably also has the same inner diameter as the first and second conduit components, and is structured to fit over the junction between the first length of conduit 229 and the second conduit component 231 sufficiently to releasably join them together in a fluid-tight manner. Thus, the "cup" formed by the glued bottom second cap 217 and first conduit component 229 is removable from the remainder of the particle separator assembly by loosening the hose clamps 227 and separating the cup from the flexible hose sleeve 225 and the second conduit component 231.

Those of ordinary skill in the art will immediately envision alternative ways of separating the bottom second cap 217 from the remainder of the particle separator assembly 201. Such alternative ways may include, without limitation, using tapped and threaded contact surfaces, or polymeric pinch buckles, preferably in conjunction with a gasket to prevent fluid leakage between a removable bottom cap and the remainder of the particle separator component.

The top end of the second conduit component 231 is secured (e.g., glued or cemented) into the bottom end of a reducer conduit component 233 having the larger diameter. In this embodiment, for example, the reducer conduit component (3 inch to 4-inch reducer) is sized to receive the top end of the second conduit component 231, having a 4-inch internal diameter. The reducer conduit component has a length of 3 inches.

The smaller end of the reducer conduit component 233, having a diameter of 3 inches in this example, is secured (e.g., glued) into the bottom junction 249 of the same "Double Sanitary Tee, Reducing" junction (comprising, as a single fitting, a 2 inch fluid inlet port 205, 2 inch fluid outlet port 215, and middle portion 251 having a 3 inch lumen), utilized in Example 1.

A third conduit component 237 is secured (e.g., glued) into the top junction 253 of the reducing double sanitary tee; in this embodiment, the third conduit component 237 is identical to the second conduit. The top end of the third conduit component is secured using a 3-inch flexible hose sleeve 243 and hose clamps 245 to the top first cap 247. In this embodiment the top cap 247 is secured to the particle separator in this manner in order to permit fine adjustment of the tongue component 209 (shown before attachment to the particle separator 201) to which it is joined. The top first cap 247 as well as the tongue component 209 are, in this embodiment, made of high-density polyester (HDPE).

Finally, in this embodiment fluid inlet connector and fluid outlet connectors are shown disassembled. The fluid inlet connector comprises an inlet conduit component 203, which in this embodiment is secured (e.g., glued) to the fluid inlet port 205, and a flexible hose sleeve component 239 and set of hose clamps 141 sized to fit over and connect the inlet conduit component 203 to a fluid inlet hose (not shown). The fluid inlet component in this embodiment has a 2-inch inner diameter.

The fluid outlet connector has an identical arrangement as the fluid inlet connector, comprising an outlet conduit component 213 glued to the fluid outlet port 215, and a flexible hose sleeve component 239 and set of hose clamps 141 sized to fit over and connect the outlet conduit component 213 to a fluid inlet hose (not shown).

Figure 9:
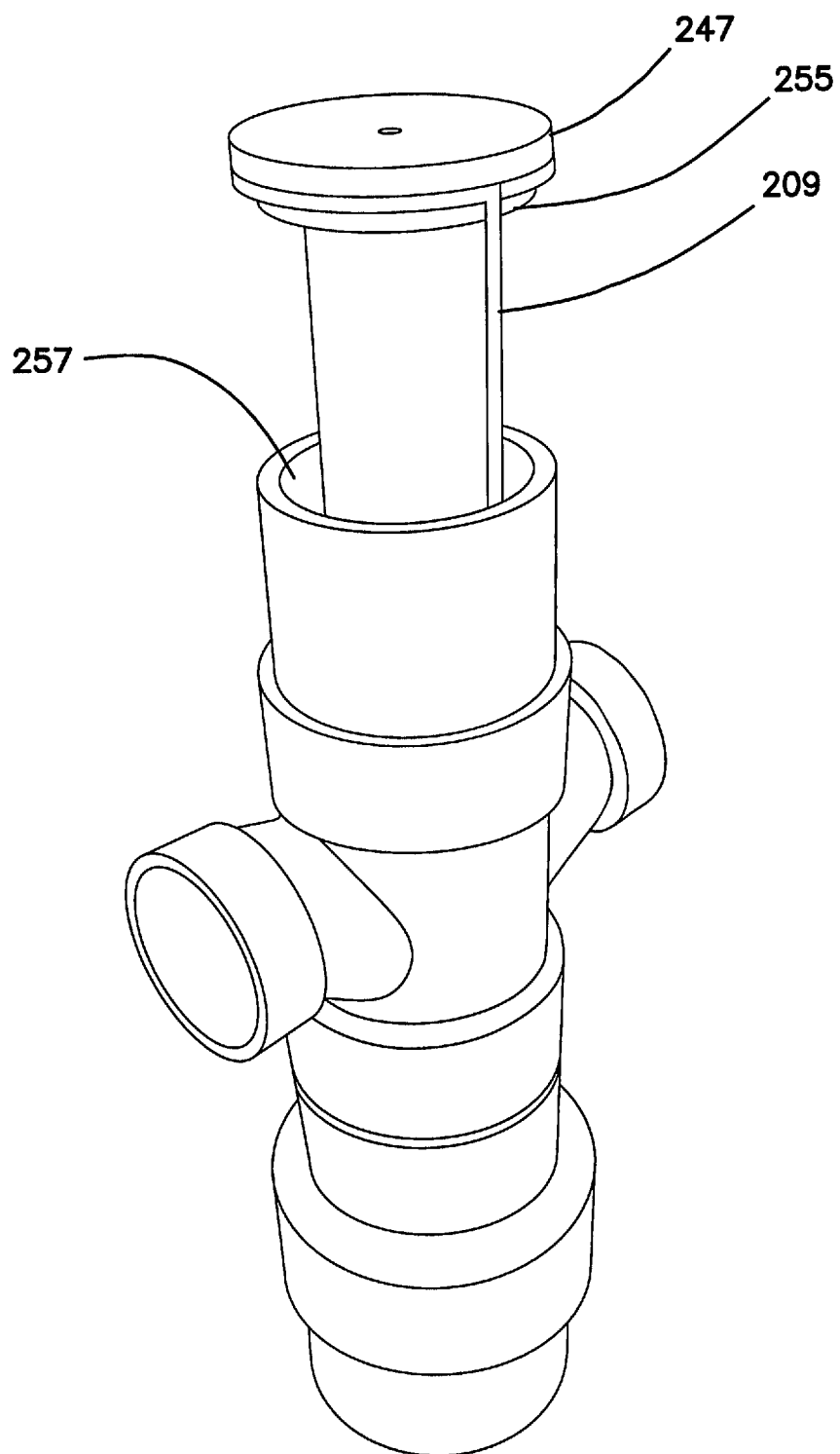
FIG. 9 shows a partially assembled view of the embodiment shown in FIG. 8.
Figure 10:
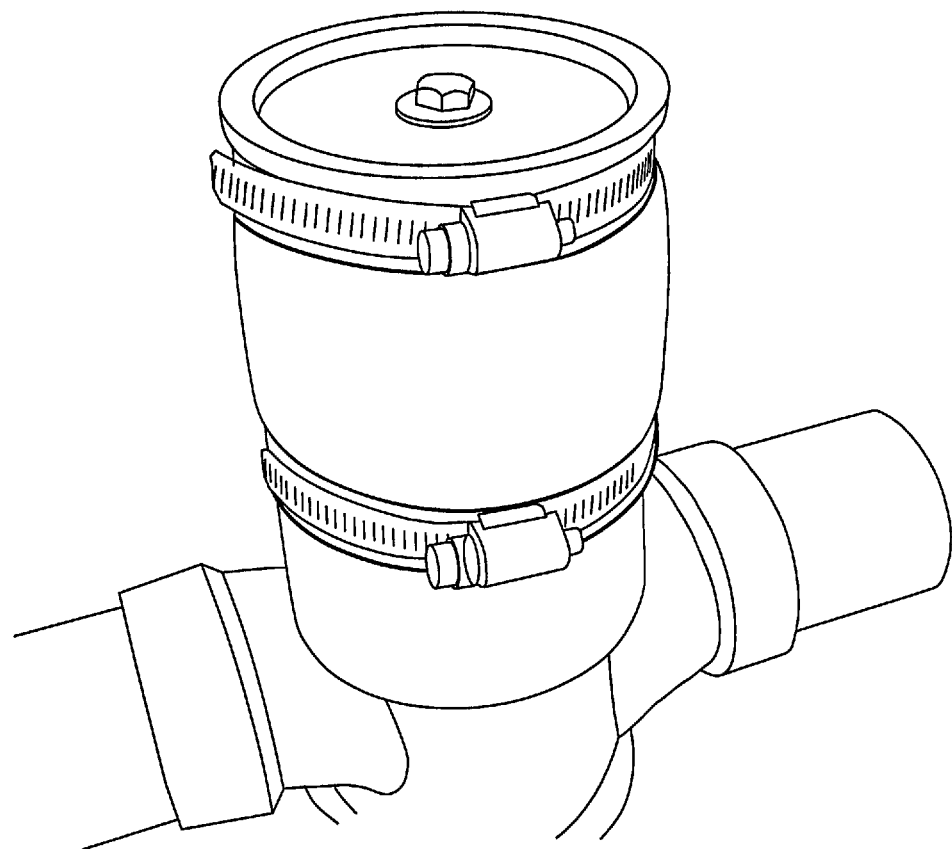
FIG. 10 shows the assembled top portion of the embodiment shown in FIG. 8.

FIG. 9 shows the tongue component 209 and top cap 247 of the particle separator partially installed and protruding from the lumen 257 of the vessel component of the particle separator 201. The tongue component, like the top cap, is made of HDPE in this embodiment. The tongue component 209 is glued into a notch cut in the bottom face of the top cap 247, and then further secured by screwing to the top cap from the upper face of the top cap as shown in FIG. 10.

Figure 11:
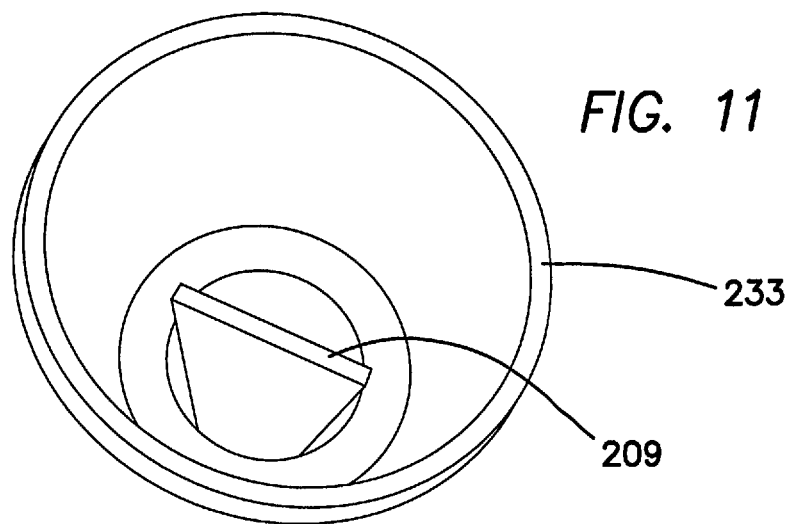
FIG. 11 is a view of the bottom portion and lumen of the expander component in the embodiment shown in FIG. 8, showing the depth of protrusion of the tongue component into the larger diameter section of the expander.

FIG. 11 shows a view into the bottom end of end of the expander/reducer conduit component 233 with the tongue component 209 installed. In this embodiment of the invention the tongue component protrudes about 1 to about 3 inches into the 4-inch diameter lumen segment of the reducer conduit component 233. The protrusion depth of the tongue component may be adjusted as necessary to ensure that the particle separator separates all commonly encountered weights and shapes of SBPs effectively. In this embodiment the length of the tongue component is 12 inches.

Figure 12:
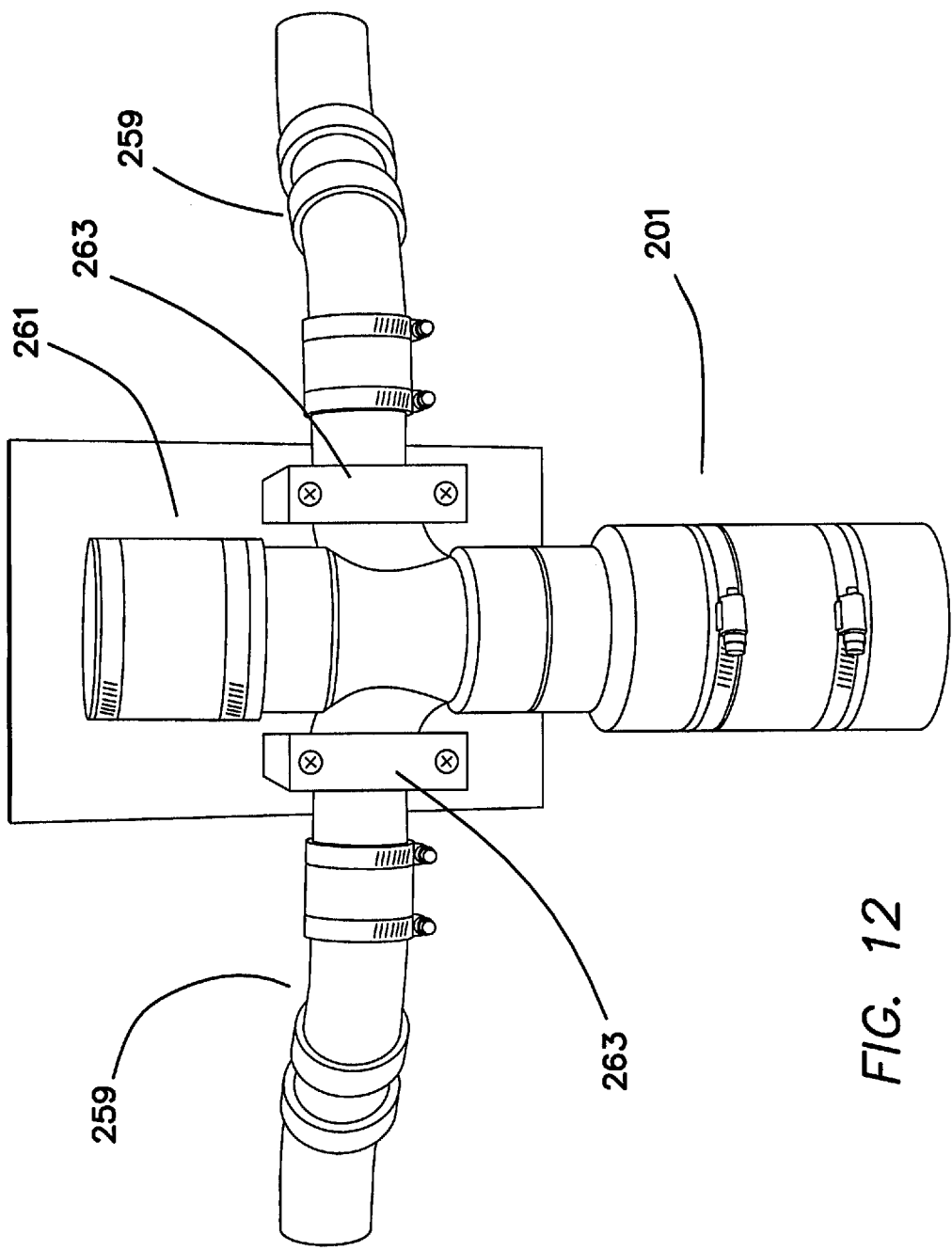
FIG. 12 is a view of the mounted and assembled particle separator shown in FIG. 8.

FIG. 12 shows the same embodiment of the particle separator 201 as fully assembled and mounted to a backing board 261 using a pair of "U"-shaped retaining members 263 mounted horizontally and fastened to the board around the fluid inlet port 205 and the fluid outlet port 215 of the particle separator 201.

Example 3

The system of Example 2, (the "Model B" Particle Separator) was tested to determine the extent to which it would successfully remove SBPs (bolts, nuts, screws, nails, washers, etc.) contained in a water flow. As described in Example 2, the "Model B" Particle Separator comprised a lumen in the bottom portion of the vessel component having an internal diameter of 4 inches in the lower portion of the vessel component (thereby lowering the local flow rate in the lower portion of the lumen) and an internal diameter of 3 inches in the upper and middle portion thereof, while the "Model A" particle separator of Example 1 had a lumen comprising an internal diameter of 3" ABS pipe for its entire vertical length.

The test was performed as follows: a hole was cut in the bottom of a 5-gallon plastic bucket, and an ABS pipe section having a 2-inch internal diameter sealed thereto and extending from the bottom of the bucket to the fluid inflow port of the particle separator. A bicycle bell turned upside down was used as an improvised stopper; this was placed resting in the opening at the bottom of the pail, with a string tied thereto for removal of the stopper and initiation of the test.

The bucket was filled with water and the flow rate of water exiting the bucket when the stopper is removed from the hole in the bottom of the bucket is estimated using a stopwatch. Five or 6 seconds passed from initiation of the start of flow until the bucket was emptied, resulting in an average flow rate of between of at least about 48 and about 60 gallons per minute, which is higher than the typical pump flow rate at a public harbor sewage pump-out station.

The test was conducted using a mixture of nails, screws, washer and bolts of various sizes, shapes and weights See FIG. 12. Immediately after fluid flow was initiated the SBPs were quickly poured into the hole at the bottom of the bucket using a section of 2" ABS conduit as a guide, whence there were swept into the particle separator.

In a total of 5 runs using 5 gallons of water and the same SBP mixture shown in FIG. 12, all the RBCs were recovered in the removable cap of the particle separator (and none in the outlet flow) after each run.

Example 4

A test of an embodiment of the particle separator is made to assess its ability to remove particles from a sewage stream. The purpose of this test is to establish that the particle separator will successfully remove particles (in this case comprising an assortment of screws, bolts and washers) from a waste flow of sewage unloaded by a sewage tanker boat in an off-loading event at the public pump-out station in Newport Bay, Calif.

The dock sewage pump system is first checked to determine its approximate flow rate. Using a 5 gallon bucket and a stopwatch the outflow pump rate was timed. Without the particle separator attached in line 5 gallons of waste is determined to be pumped by the sewage pump in 13 seconds (approximately 23 gallons per minute). When the particle separator is connected in line, the flow rate is decreased to approximately 19 gallons per minute. Thus, in this experiment, the introduction of the particle separator between the fluid source and the pump reduced the flow rate of the sewage pump to 82.6% of its rate in the absence of the particle separator. Preferably, the flow rate of the pump with the particle separator attached in the fluid line is at least 60% or at least 70% or at least 80% or at least 82% or at least 90% of the flow rate of the pump in an otherwise identical test without the particle separator.

Figure 14:
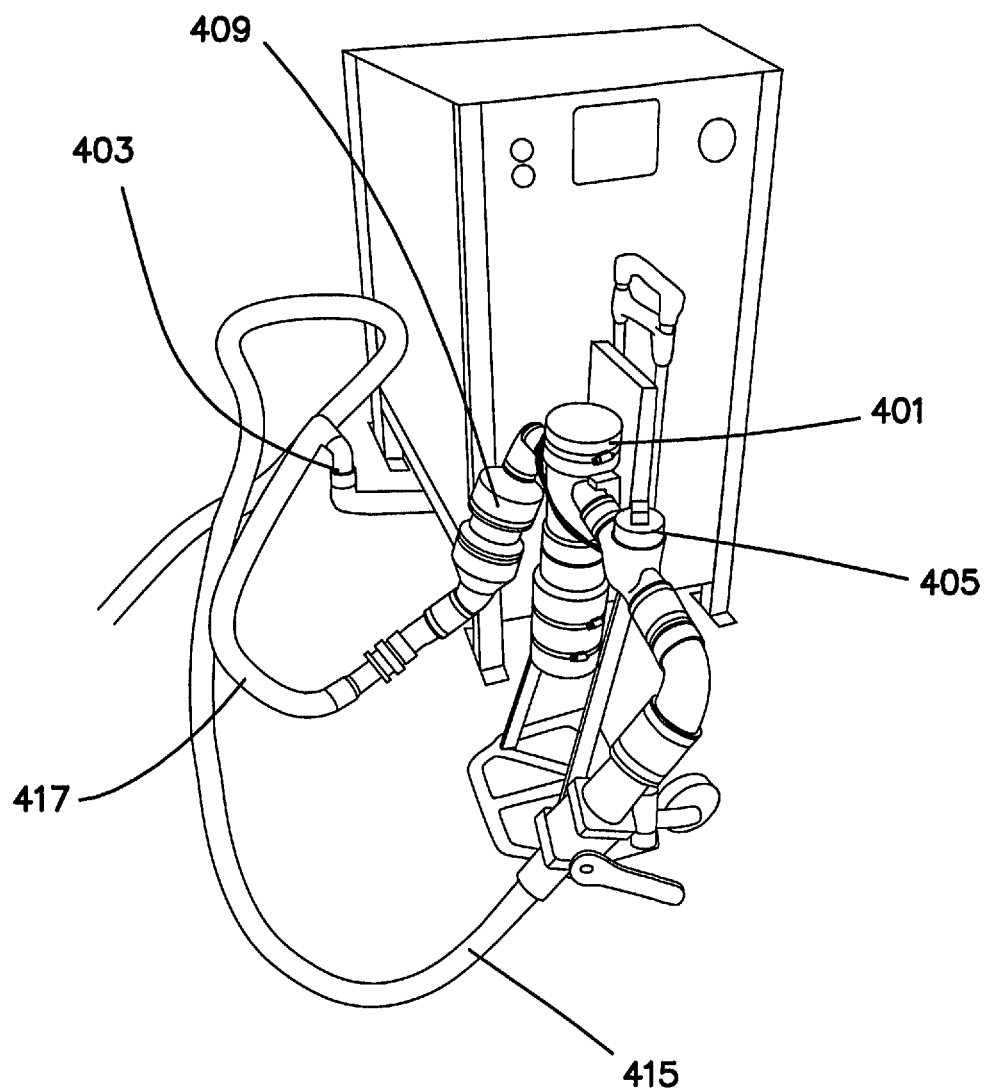
FIG. 14 shows a particle separator of the present invention connected to an upstream fluid inlet hose and a downstream fluid outlet hose which is in turn connected to a sewage pump.
Figure 15:
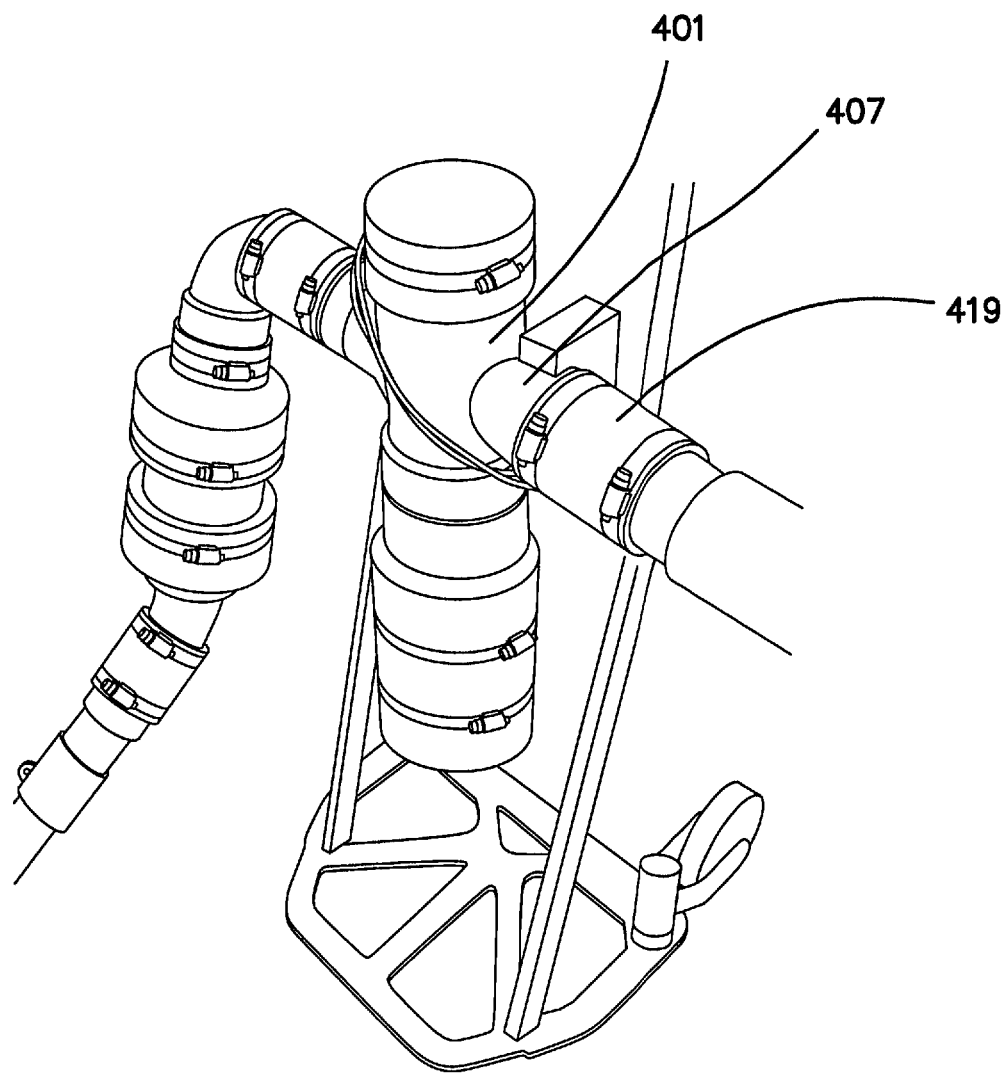
FIG. 15 is a close-up of the particle separator of FIG. 14.
Figure 16:
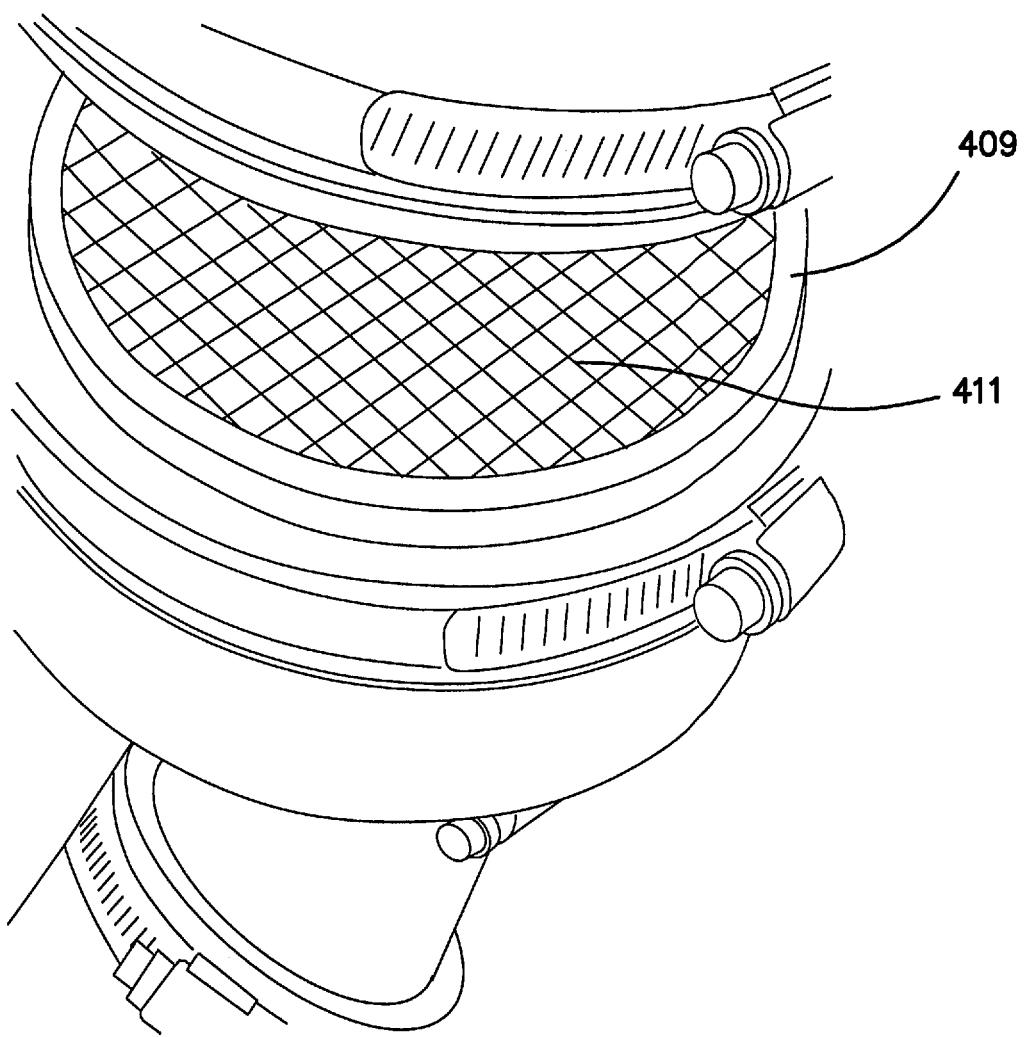
FIG. 16 shows a protective screen assembly attached between the particle separator and the sewage pump.
Figure 17:
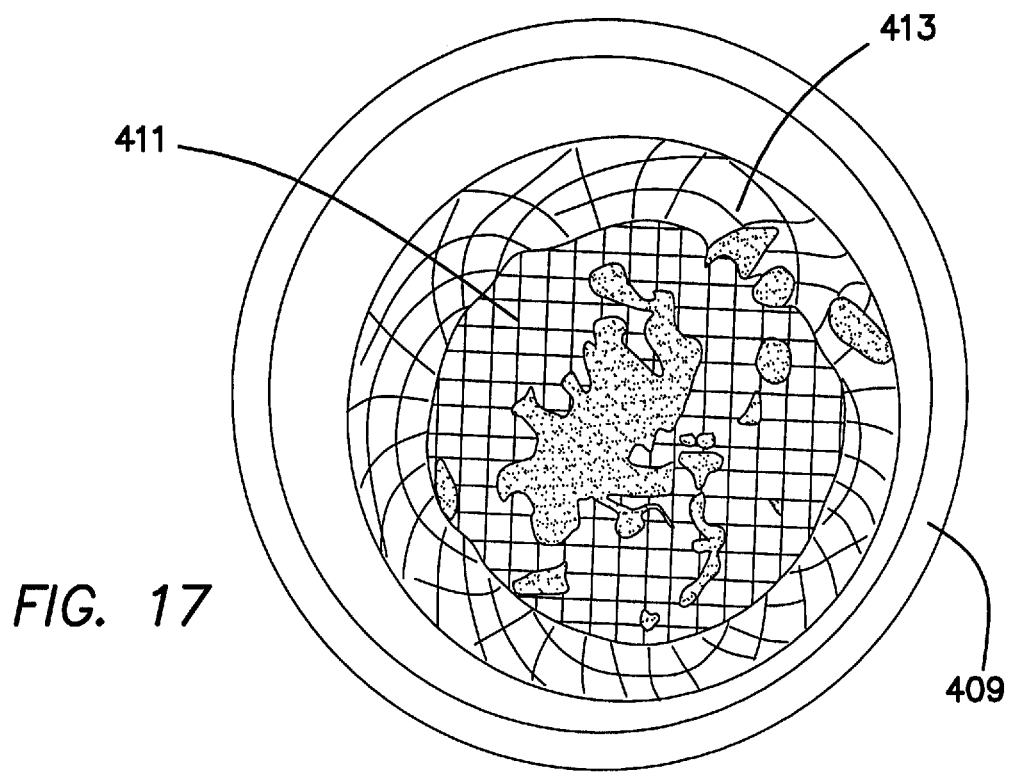
FIG. 17 shows the protective screen of the protective screen assembly following a test run of sewage containing particles.

FIG. 14 shows the particle separator 401 connected to the fluid stream upstream of the sewage pump inlet 403. The particle separator 401, is connected with a "Y" fitting 405 positioned immediately upstream of the particle separator 401; the Y fitting 405 permits different batches of particles to be introduced to the particle separator fluid inlet port 407. A protective screen assembly 409; see FIGS. 14 and 16, is made comprising a section of transparent 4" (10.16 cm) diameter cylindrical polymer pipe (such as a polyvinyl chloride-, polycarbonate-, or acrylic-based polymer (such as Plexiglass®)(see 411; FIGS. 16 and 17)) containing a ¼" (6.35 mm) wire mesh screen) (see 413; FIGS. 16 and 17) provided on the outflow side of the particle separator. This is provided during the test for positive safety protection for the pump in the unexpected event that a particle is not intercepted by the particle separator.

A 23 foot inlet hose 415 is connected to the particle separator between the sewage tank and the input side of the particle separator. The output side of the protective screen assembly 409 is connected to the pump with a shorter outlet hose of the same diameter 417.

Figure 18:
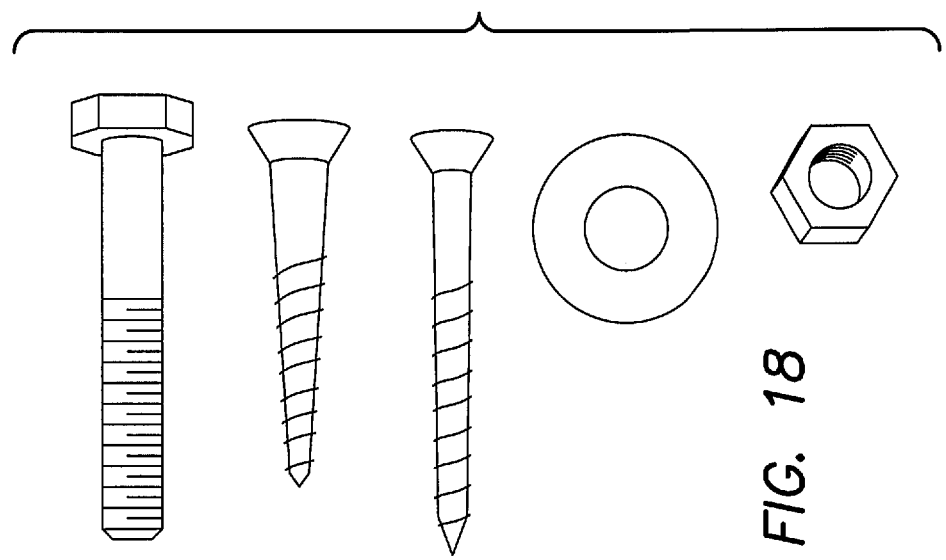
FIG. 18 shows the five particle types to be used in the test.
Figure 13:
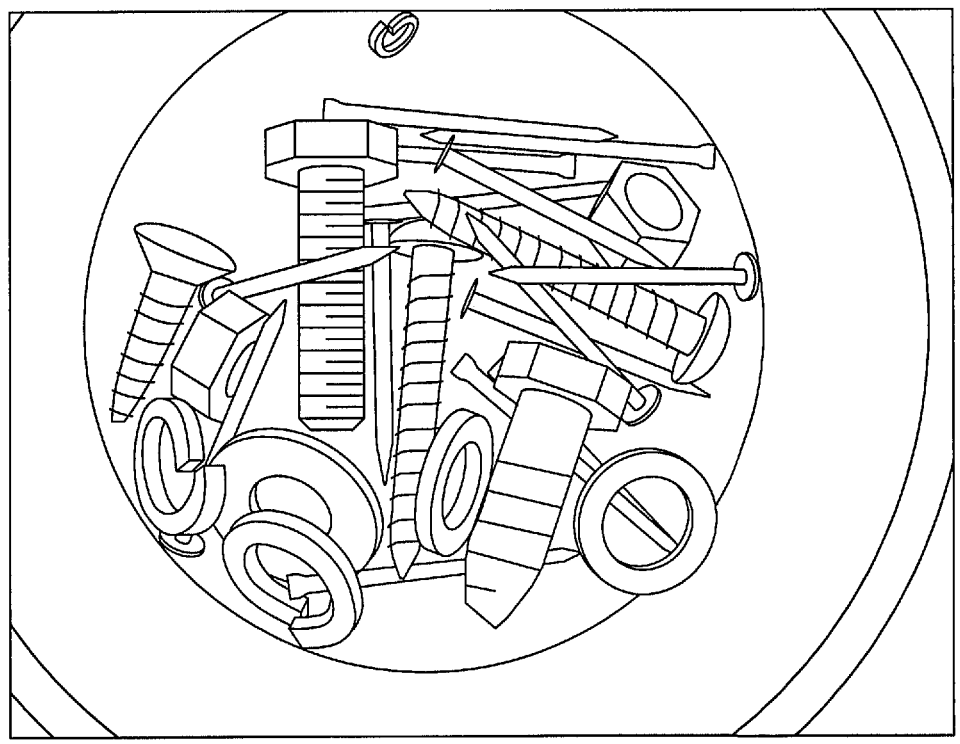
FIG. 13 shows the solid body articles (SBPs) used for the tests described in Example 3.

The test is organized so that five batches of particles are introduced separately to the particle separator. Each particle batch consists of 10 each of five different particles (two different screws, a bolt, a washer and a nut, as shown in FIG. 18).

Unloading of sewage from the tanker is initiated and the pump is permitted to run for a few minutes until waste flow is observed in the 4" clear cylinder of the protective screen assembly 409. The pump is then turned off, a plug is removed from the Y fitting 405 and the first batch of 10 particles is introduced into the fluid inlet conduit 419; the plug is then replaced.

The pump is turned on and run for a few minutes. The pump is then turned off, a second batch of 50 particles is introduced into the input pipe, and the plug is replaced again. This procedure is repeated until all the remaining batches of particles have been introduced.

The intake hose 415 is then removed from the sewage tank, the system is first flushed with 5 gallons of sea water with the pump running, then then end of the intake hose 415 is placed into the bay and the sea water flushing continued for a few additional minutes. The safety screen assembly is removed and the cavity inspected. There are no particles in the screened chamber. See FIG. 17.

Figure 19:
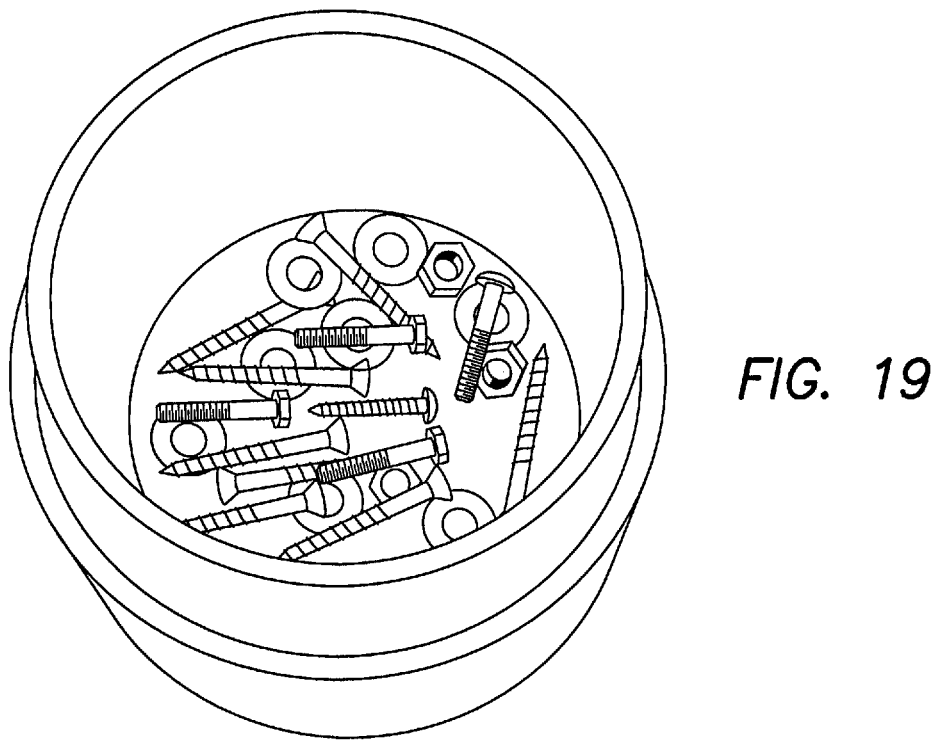
FIG. 19 shows the removable bottom cap of the particle separator containing particles retained during testing of the particle separator.

The bottom "receiver" cap of the particle separator unit is removed and inspected. All the particles introduced into the particle separator are observed collected in the bottom cap, see FIG. 19, with the exception of four of the ¼ inch×1¼ inch (6.35 mm×3.17 cm) stainless steel hex bolts are found in the intake hose, where they failed to enter the particle separator during the experiment.

Thus, the particle separator successfully removes all of the particles that are introduced into it from the sewage waste flow in this test, with no particle entering the hose section 417 between the particle separator and the pump. Additionally, it is clear from this experiment that the increased viscosity of sewage as compared to water (which was used as the test fluid for the preliminary testing described in Example 3) does not diminish the effectiveness of particle separation or significantly decrease the flow rate of the fluid flow.

Figure 20:
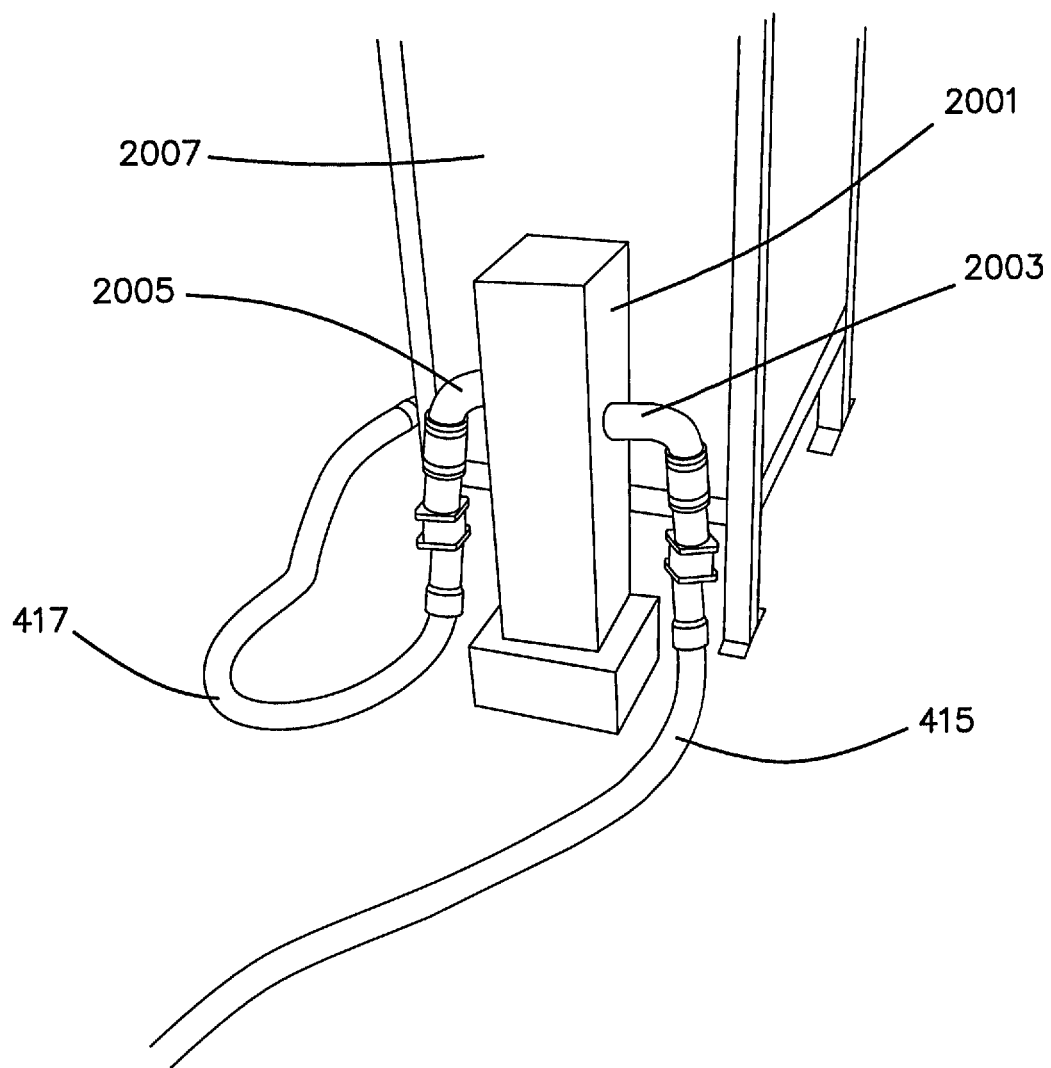
FIG. 20 shows the particle separator of FIG. 14 contained within a closed housing and connected to the sewage pump.

It will be understood by those of ordinary skill in the art that that the particle separators of this invention may in some cases be retained within a housing to prevent tampering. Such a housing may be constructed using any suitably material including, without limitation, wood, metal, a polymeric substance, or a combination of these. The housing may contain the body of one or more particle separators, permitting access to the fluid inlet port and the fluid outlet port while reducing the potential for vandalism or tampering with the device. FIG. 20 shows one such embodiment, with the particle separator contained in a padlocked housing 2001, with connections 2003, 2005 to the inlet hose 415 and the outlet hose 417 leading to the pump 2007.

Figure 21:
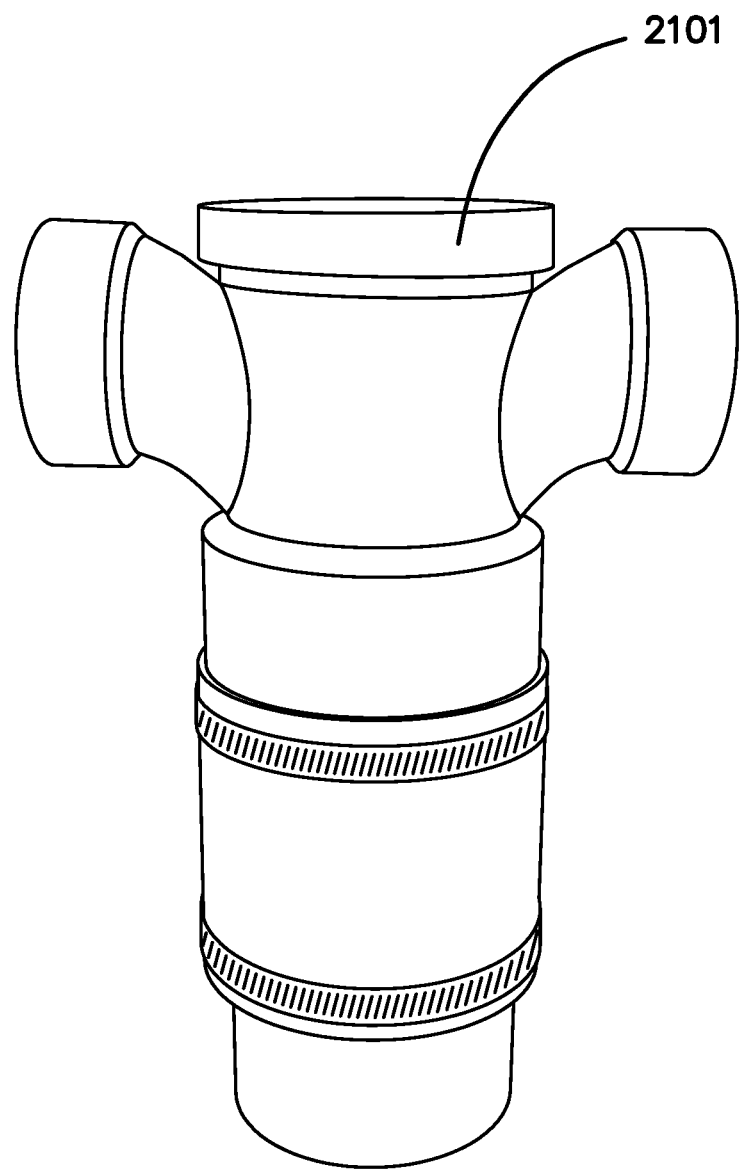
FIG. 21 shows an embodiment of the particle separator in which the top portion of the particle separator comprises a top cap and no lumen.

FIG. 21 shows an embodiment of the particle separator of the present invention in which the top portion 2101 comprises simply a lip within which a water-tight top cap is joined, and lacking a lumen portion. The tongue component is joined to the inside surface of the top cap just above the fluid inlet port and fluid outlet port.

Example 5

Figure 22:
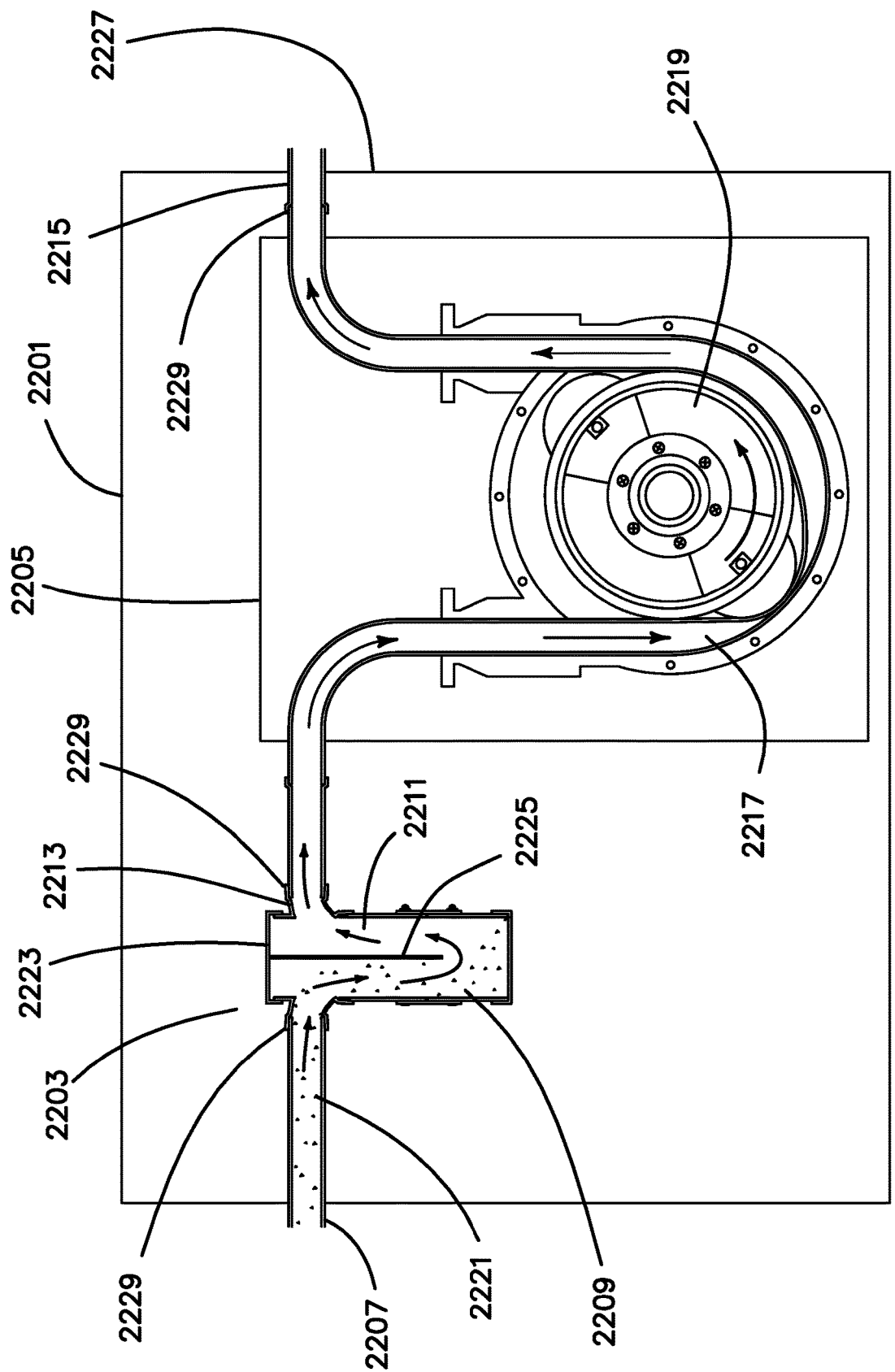
FIG. 22 is a schematic representation of an embodiment of a Pump/Particle Separator Assembly (PPSA) showing the fluid flow through the PPSA assembly.

FIG. 22 shows schematic view of a pump/particle separator assembly (PPSA) 2201, and items shown are not intended to be to scale. As shown, the PPSA is contained within a common housing 2227. Fluid flow is initiated by operation of pump 2205, which causes negative pressure (suction) in particle separator 2203 and fluid inlet conduit 2207, and fluid to flow into the particle separator 2203 from the fluid source (not shown) through fluid inlet conduit 2207. The particle separator's top portion as shown in this figure has a top cap (not visible) secured within a lip 2223; the top portion in this figure lacks a lumen section.

Fluid flowing through the fluid inlet conduit 2207 containing SBPs 2221 enters the particle separator inlet port, where the fluid flow encounters the tongue component 2225 and is directed downward toward the larger bottom portion of the particle separator, where the fluid flow temporarily slows and SBPs carried by the fluid into the particle separator 2209 fall into the bottom of the particle separator 2203. As the fluid reaches the lower tip of the tongue component 2225 it reverses direction and, now depleted of SBPs, flows upward towards the pump component along the opposite side of the tongue component. The fluid exits the particle separator via fluid outlet port 2213 end enters the pump component 2205. The schematic shows an idealized peristaltic pump component. The fluid now introduced into flexible conduit (such as polymeric hosing) is urged through the pump by a rotating roller assembly 2219, after which it exits the pump component and the PPSA housing 2227. Fluid junctions 2229, such as those depicted connecting the fluid inlet conduit and fluid outlet conduit to the particle separator, are used to fluidly connect fluid lines, such as internal portions of the PPSA and/or fluid inlet conduit and fluid outlet conduit to the PPSA. The placement and number of fluid junctions 2229 shown schematically in FIG. 22 are meant to be optional and illustrative only, and those of ordinary skill will immediately understand that in practice such placement and number will depend upon the circumstances of use. Depending on their placement, fluid junctions may employ connectors known to those of skill in the art, such connectors may include, without limitation, temporary or semi-temporary connectors such as hose clamps, unions, camlock connectors and the like, or more permanent cements, glues, welds and the like.

Figure 23:
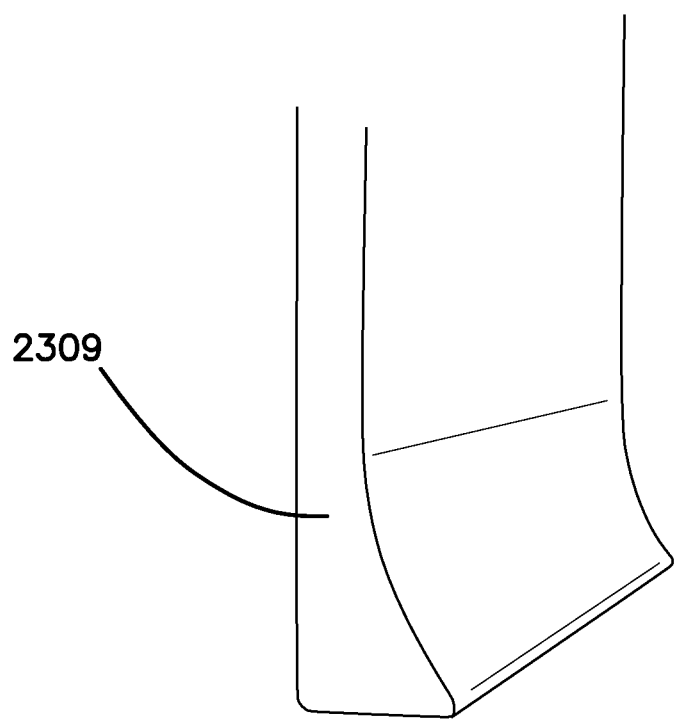
FIG. 23 is a view of an embodiment of the tongue component of the particle separator in which the tip of the togue component is curved.

FIG. 23 shows an embodiment of the tongue component of the particle separator in which the tip 2309 of the tongue component is curved.

While the examples of this specification provide illustrations of the utility of this invention in cases involving sewage treatment and boating, the person of ordinary skill in the art will immediately understand that the invention, is not limited by these examples. The invention generally involves simultaneously modifying the direction and flow rate of fluids containing suspended SBPs passing through a conduit to remove the SBPs from the mobile fluid phase by gravity and inertia. Thus, this method may be used in myriad specific applications including, without limitation, enrichment of ore from fluid flows in mining operations, natural gas extraction, disaster relief.

The particle separators themselves may be far larger than the prototypes exemplified herein, and may be comprised of materials include, without limitation, metals and/or polymers. Particle separators of the present invention may be formed or molded in one or more sections: for example, the majority of the vessel component may be formed as a single part, the bottom cap and the top cap as separate parts, and the tongue component as an additional part.

Although particular embodiments of the invention have been shown and described, it is to be understood that the above description is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims. For example, not all of the components or specifications described in a particular embodiments are necessary, the invention may variously include any suitable and effective combinations of the described components, and the general shapes and relative sizes of the components of the invention may be modified. Accordingly, embodiments are intended to exemplify alternatives, modifications, and equivalents that may fall within the scope of the claims. The invention, therefore, should not be limited by the description except to the subject matter defined by the following claims and their equivalents.

I claim:

1. An apparatus for the separation of solid body particles (SBPs) from a fluid, said apparatus comprising:

a) a fluid inlet port and a fluid outlet port, and
b) a fluid-tight vessel component in fluid communication with said fluid inlet port and said fluid outlet port; said vessel component defining a lumen therewithin, said lumen being substantially symmetrical in cross section along its length and being oriented substantially perpendicularly to the direction of fluid flow entering the fluid inlet port; said vessel component having
   a. a top portion,
   b. a middle portion comprising said fluid inlet port and fluid outlet port, and
   c. a bottom portion comprising a removable bottom cap; and
c) a tongue component positioned within the lumen of the vessel component and oriented substantially perpendicularly to the direction of fluid flow entering the fluid inlet port;
said tongue component substantially fluid-sealingly dividing said lumen into two sections having substantially equal volumes along the length of the tongue component, each said lumen section being bounded by a surface of the tongue component and an inner lumen wall, said lumen sections comprising:
   A) a first lumen section in direct fluid communication with said fluid inlet port and extending downward along a first surface of said tongue component through the middle portion of said vessel component and extending partly into the bottom portion of the vessel component, and
   B) a second lumen section in direct fluid communication with said fluid outlet port and extending downward along a second surface of said tongue component through the middle portion of said vessel component and extending partly into the bottom portion of said vessel component;
   wherein a bottom tip of said tongue component extends into the bottom portion of the vessel component, but terminates above the bottom of the lumen.

2. The apparatus of claim 1 in which a bottom tip of said tongue component is curved away from a centerline of said lumen.

3. The apparatus of claim 1 comprising an expander/reducer component located between the middle portion and bottom portion, said expander/reducer component comprising a hollow interior having an upper cross-sectional inner diameter substantially the same as the cross-sectional inner diameter of the middle portion of the vessel component and a lower inner diameter substantially the same as the cross-sectional inner diameter of the bottom portion of the vessel component, wherein said upper cross-sectional inner diameter is less than said lower cross-sectional inner diameter.

4. The apparatus of claim 3 wherein said expander reducer component has a first end having an inner diameter which is slightly smaller, slightly larger, or the same as the middle portion of the vessel component and a second end having an inner diameter which is slightly smaller, slightly larger, or the same as the bottom portion of the vessel component.

5. The apparatus of claim 1 fluidly connected between a pump and a fluid source.

6. The apparatus of claim 5 in which the apparatus and the pump to which it is fluidly attached are contained withing a common housing.

7. The apparatus of claim 1 in which the vessel component of the particle separator comprises a material selected from the group consisting of a metal, a metal alloy, and a polymeric material.

8. The apparatus of claim 1 in which the vessel component of the particle separator comprises assembled segments joined by gluing, welding, cementing, or by the use of one or more joint or union.

9. The apparatus of claim 1 in which the vessel component of the particle separator is wholly or partially molded.

10. A method for removing solid body particles (SBPs) from a fluid comprising
   a) introducing fluid containing (SBPs) into a fluid inlet port of a particle separator apparatus comprising
      i) said fluid inlet port,
      ii) a fluid outlet port,
      iii) a vessel component in fluid communication with said fluid inlet port and said fluid outlet port; said vessel component defining a lumen and being otherwise substantially fluid-tight, said lumen being substantially symmetrical in cross section along its length and being oriented substantially perpendicularly to the direction of fluid flow entering the fluid inlet port; said vessel component having a top portion, a middle portion comprising said fluid inlet port and fluid outlet port, and a bottom portion comprising a removable bottom cap, and
      iv) a tongue component positioned within the lumen of the vessel component and oriented substantially perpendicularly to the direction of fluid flow entering the fluid inlet port; said tongue component substantially fluid-sealingly dividing said lumen into two sections having substantially equal volumes along the length of the tongue component, each said lumen section being bounded by a surface of the tongue component and an inner lumen wall, said lumen sections comprising:
         A) a first lumen section in direct fluid communication with said fluid inlet port and extending downward along a first surface of said tongue component through the middle portion of said vessel component and extending partly into the bottom portion of the vessel component, and
         B) a second lumen section in direct fluid communication with said fluid outlet port and extending downward along a second surface of said tongue component through the middle portion of said vessel component and extending partly into the bottom portion of said vessel component;
      wherein a bottom tip of said tongue component extends into the bottom portion of the vessel component, but terminates above the bottom of the lumen; and
   b) collecting fluid depleted of solid body particles (SBPs) from the fluid outlet port of said particule separator apparatus.

11. The method of claim 10 in which said fluid is not a liquid.

12. The method of claim 10 wherein said fluid is a liquid.

13. The method of claim 12 in which said liquid comprises sewage.

14. The method of claim 10 in which the fluid containing SBP's is introduced to the fluid inlet port and collected from the fluid outlet port with the aid of a fluid pump component.

15. The method of claim 14 in which the fluid pump component and the particle separator component are contained in a common housing.

16. The method of claim 10 in which the particle separator component comprises an expander/reducer component located between the middle portion and bottom portion of the vessel component, said expander/reducer component comprising a hollow interior having an upper cross-sectional inner diameter substantially the same as the cross-sectional inner diameter of the middle portion of the vessel component and a lower inner diameter substantially the same as the cross-sectional inner diameter of the bottom portion of the vessel component, wherein said upper cross-sectional inner diameter is less than said lower cross-sectional inner diameter.

17. The method of claim 10 in which the vessel component of the particle separator comprises a material selected from the group consisting of a metal, a metal alloy, and a polymeric material.

18. The method of claim 10 in which the vessel component of the particle separator comprises assembled segments joined by gluing, welding, cementing, or by the use of one or more joint or union.

19. The method of claim 10 in which a bottom tip of the tongue component is curved away from a centerline of said lumen.

\* \* \* \* \*